US010656626B2

(12) United States Patent
Jacobs, II

(10) Patent No.: US 10,656,626 B2
(45) Date of Patent: May 19, 2020

(54) METHODS AND SOFTWARE FOR MANUFACTURING A DISCRETE OBJECT FROM AN ADDITIVELY MANUFACTURED BODY OF MATERIAL INCLUDING A PRECURSOR TO A DISCRETE OBJECT AND A REFERENCE FEATURE(S)

(71) Applicant: Proto Labs INC, Maple Plain, MN (US)

(72) Inventor: James L. Jacobs, II, New London, NH (US)

(73) Assignee: Proto Labs, Inc., Maple Plain, MN (US)

( * ) Notice: Subject to any disclaimer, the term of this patent is extended or adjusted under 35 U.S.C. 154(b) by 0 days.

(21) Appl. No.: 15/995,944

(22) Filed: Jun. 1, 2018

(65) Prior Publication Data

US 2018/0348738 A1   Dec. 6, 2018

Related U.S. Application Data

(60) Provisional application No. 62/513,694, filed on Jun. 1, 2017.

(51) Int. Cl.
*G05B 19/4099* (2006.01)
*B22F 3/105* (2006.01)
(Continued)

(52) U.S. Cl.
CPC ........ *G05B 19/4099* (2013.01); *B22F 3/1055* (2013.01); *B22F 3/24* (2013.01);
(Continued)

(58) Field of Classification Search
None
See application file for complete search history.

(56) References Cited

U.S. PATENT DOCUMENTS 5,398,193 A * 3/1995 deAngelis .............. B33Y 30/00
700/119
5,510,066 A * 4/1996 Fink ........................ B29C 64/40
264/40.1
(Continued)

FOREIGN PATENT DOCUMENTS

WO   2015193103   12/2015

OTHER PUBLICATIONS

Will Adams, Workholding,website, Feb. 14, 2019 Retrieved on Apr. 19, 2017 from https://www.shapeoko.com/wiki/index.php/Workholding#Others.

*Primary Examiner* — Ramesh B Patel
(74) *Attorney, Agent, or Firm* — Caldwell Intellectual Propert

(57) ABSTRACT

A system for manufacturing a discrete object from an additively manufactured body of material including a precursor to a discrete object and at least a reference feature is disclosed. The system includes an automated manufacturing device, the automated manufacturing device including at least a controller configured to receive a graphical representation of precursor to a discrete object, receive a graphical representation of at least a reference feature on the precursor to the discrete object, and generate a computer model of the body of material, wherein the computer model of the body of material includes the graphical representation of the precursor to the discrete object and the graphical representation of the at least a reference feature.

20 Claims, 16 Drawing Sheets

(51) Int. Cl.

| | | |
|---|---|---|
| *B29C 64/153* | (2017.01) | |
| *B29C 64/393* | (2017.01) | |
| *B29C 64/245* | (2017.01) | |
| *B23K 26/38* | (2014.01) | |
| *B23Q 15/14* | (2006.01) | |
| *B33Y 10/00* | (2015.01) | |
| *B33Y 30/00* | (2015.01) | |
| *B29C 64/386* | (2017.01) | |
| *B33Y 50/00* | (2015.01) | |
| *B22F 3/24* | (2006.01) | |
| *B33Y 50/02* | (2015.01) | |

(52) U.S. Cl.
CPC .............. *B23K 26/38* (2013.01); *B23Q 15/14* (2013.01); *B29C 64/153* (2017.08); *B29C 64/245* (2017.08); *B29C 64/386* (2017.08); *B29C 64/393* (2017.08); *B33Y 10/00* (2014.12); *B33Y 30/00* (2014.12); *B33Y 50/00* (2014.12); *B22F 2003/1056* (2013.01); *B22F 2003/1057* (2013.01); *B22F 2003/1058* (2013.01); *B22F 2998/10* (2013.01); *B23Q 2735/006* (2013.01); *B23Q 2735/065* (2013.01); *B33Y 50/02* (2014.12)

(56) References Cited

U.S. PATENT DOCUMENTS

| | | |
|---|---|---|
| 5,634,757 A | 6/1997 | Schanz |
| 6,019,359 A | 2/2000 | Fly |
| 6,152,436 A | 11/2000 | Sonderegger |
| 6,367,791 B1 | 4/2002 | Calderon et al. |
| 7,454,869 B2 | 11/2008 | Owen |
| 7,901,166 B2 | 3/2011 | Halford |
| 8,434,208 B2 | 5/2013 | Jacobsen et al. |
| 8,584,344 B2 | 11/2013 | Peterson |
| 9,140,284 B2 | 9/2015 | Black |
| 9,550,349 B1* | 1/2017 | Larsen .................. B32B 38/0004 |
| 2014/0252684 A1* | 9/2014 | Swanson .............. B29C 67/0055 264/401 |
| 2016/0144471 A1 | 5/2016 | Tatsuda |
| 2016/0185009 A1* | 6/2016 | Keshavan .............. B28B 1/001 249/134 |
| 2016/0311022 A1* | 10/2016 | Krebs ................... B22F 3/1055 |
| 2017/0021565 A1* | 1/2017 | Deaville ............... B29C 70/382 |
| 2017/0037674 A1* | 2/2017 | Hooper ..................... E06B 3/12 |
| 2017/0057155 A1 | 3/2017 | Barnes |
| 2017/0120337 A1* | 5/2017 | Kanko .................. B22F 3/1055 |
| 2017/0249417 A1* | 8/2017 | Gosieski, Jr. ....... G06F 17/5086 |
| 2017/0259507 A1* | 9/2017 | Hocker .................. B33Y 10/00 |
| 2017/0297104 A1* | 10/2017 | Gibson .................. B33Y 30/00 |
| 2018/0141284 A1* | 5/2018 | Wilenski ............... B29C 64/135 |
| 2018/0154588 A1* | 6/2018 | Wilenski ............... B33Y 10/00 |
| 2018/0236728 A1* | 8/2018 | Hovanec ............... B33Y 30/00 |
| 2018/0276316 A1* | 9/2018 | Brochu ..................... G06T 17/00 |
| 2018/0284726 A1* | 10/2018 | Jacobs, II .......... G05B 19/4099 |
| 2018/0307209 A1* | 10/2018 | Chin ....................... B22F 3/008 |
| 2018/0335766 A1* | 11/2018 | Jacobs, II .......... G05B 19/4099 |
| 2019/0011903 A1* | 1/2019 | Jacobs, II .......... G05B 19/4099 |

\* cited by examiner

METHODS AND SOFTWARE FOR MANUFACTURING A DISCRETE OBJECT FROM AN ADDITIVELY MANUFACTURED BODY OF MATERIAL INCLUDING A PRECURSOR TO A DISCRETE OBJECT AND A REFERENCE FEATURE(S)

RELATED APPLICATION DATA

This application claims the benefit of priority of U.S. Provisional Patent Application Ser. No. 62/513,694, filed on Jun. 1, 2017, and titled "METHODS AND SOFTWARE FOR MANUFACTURING A DISCRETE OBJECT FROM AN ADDITIVELY MANUFACTURED BODY OF MATERIAL INCLUDING A PRECURSOR TO A DISCRETE OBJECT AND A REFERENCE FEATURE(S)," which is incorporated by reference herein in its entirety.

FIELD OF THE INVENTION

The present invention generally relates to the field of subtractive manufacturing. In particular, the present invention is directed to methods and software for manufacturing a discrete object from an additively manufactured body of material including a precursor to a discrete object and reference feature(s)

BACKGROUND

Many types of objects are manufactured using rotary-tool milling and other types of subtractive manufacturing processes. Typically, a single object is made from a block or slab of steel or aluminum. For example, steel and aluminum parts for any of a wide variety of assemblies are often machined from individual bodies of material using one or more milling machines. However, making such machined parts can be labor intensive as operators load and unload individual bodies of material to and from milling machines. In addition, geometries are limited to those that can be manufactured economically by a subtractive manufacturing process.

SUMMARY OF THE DISCLOSURE

In an aspect, a system for manufacturing a discrete object from an additively manufactured body of material including a precursor to a discrete object and at least a reference feature is disclosed. The system includes an automated manufacturing device, the automated manufacturing device including at least a controller configured to receive a graphical representation of precursor to a discrete object, receive a graphical representation of at least a reference feature on the precursor to the discrete object, and generate a computer model of the body of material, wherein the computer model of the body of material includes the graphical representation of the precursor to the discrete object and the graphical representation of the at least a reference feature.

In another aspect, a method of manufacturing a discrete object from an additively manufactured body of material including a precursor to a discrete object and at least a reference feature includes receiving, at an automated manufacturing device, a graphical representation of precursor to a discrete object. The method includes receiving, at the automated manufacturing device, a graphical representation of at least a reference feature on the precursor to the discrete object. The method includes generating, at the automated manufacturing device, a computer model of the body of material, wherein the computer model of the body of material includes the graphical representation of the precursor to the discrete object and the graphical representation of the at least a reference feature.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
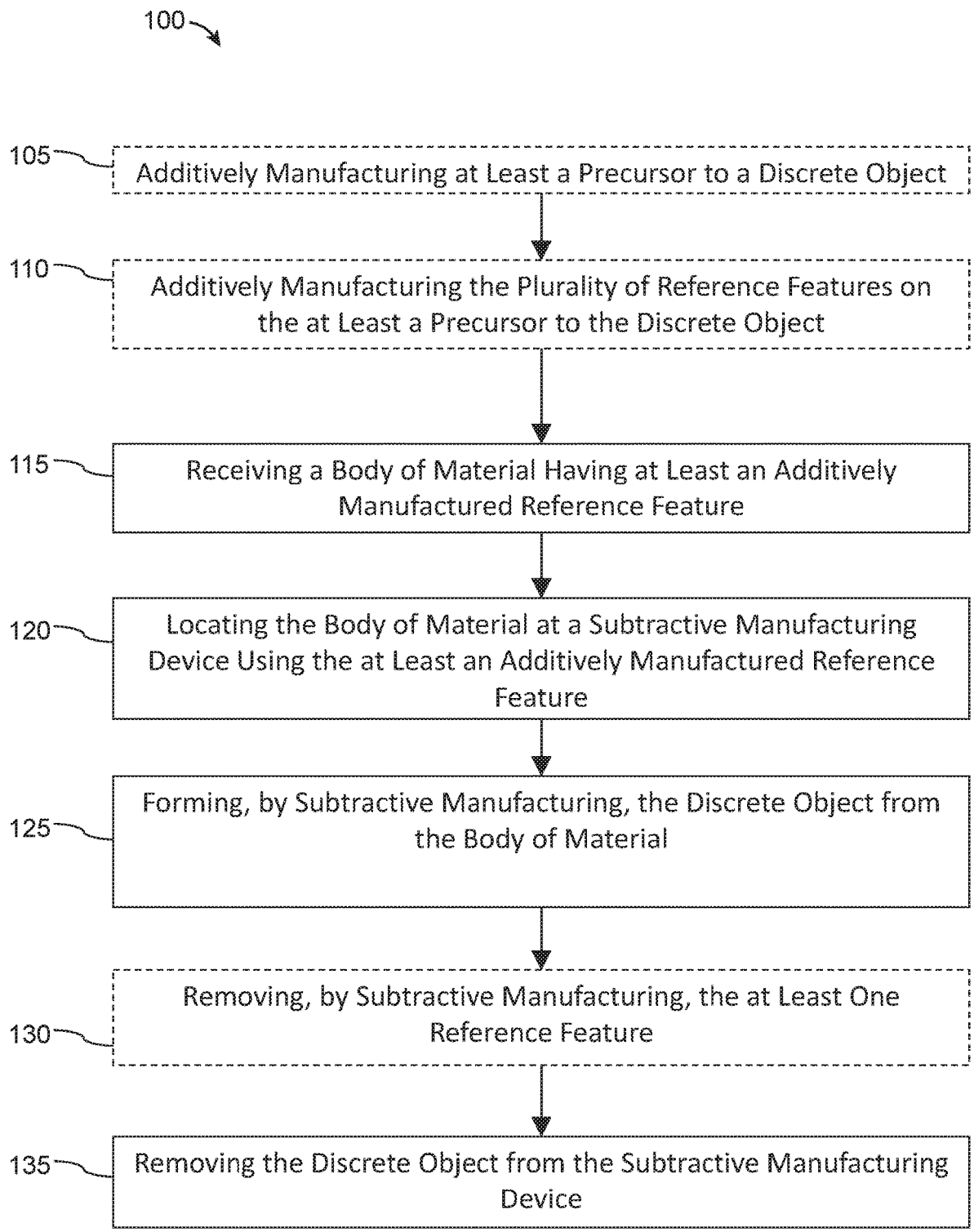
FIG. 1 is a flow diagram illustrating an exemplary method of manufacturing a discrete object from an additively manufactured body of material including a precursor to a discrete object and at least a reference feature in an embodiment.

In one aspect, the present disclosure is directed to methods of manufacturing a discrete object from an additively manufactured body of material including a precursor to the discrete object and at least a reference feature. The reference feature or reference features may enable the additively manufactured body of material to be located at a manufacturing device; the location may be precise so that manufacturing steps designed or generated by reference to an orientation or coordinate system of the manufacturing device are able to manufacture the discrete object precisely. In an embodiment, the additively manufactured body of material may be manufactured; the at least a reference feature, the precursor, or both may be additively manufactured.

Embodiments of this method include the performance of manufacturing processes. In some embodiments, a manufacturing process is a process used to form a product, which may be an end-product or a part used to assemble an end-product, by the performance of one or more manufacturing steps. As used herein, a workpiece is an object that will become a product when the one or more manufacturing steps been performed. One or more steps in the production of product may include physical modifications to workpiece or programming and modeling steps used to perform the modifications, such as modeling the workpiece or product, or computing toolpaths or other algorithms for the product's manufacture.

One or more steps may include a subtractive manufacturing process, which produces the product by removing material from a workpiece; the removal of material may be accomplished using abrasives, cutting tools or endmills, laser cutting or ablation, removal using heat, or any other method that removes material from the workpiece. Each subtractive manufacturing process used may be any suitable process, such as, but not limited to, rotary-tool milling, electronic discharge machining, ablation, etching, erosion, cutting, and cleaving, among others.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

One or more steps may include an additive manufacturing process, in which material is deposited on the workpiece. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g. forging and additive manufacturing as described above. As an example, a forged body of material may have welded material deposited upon it which then comprises an additive manufactured body of material.

Deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing, or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed, and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

Referring now to FIG. 1, an exemplary method 100 of manufacturing a discrete object from an additively manufactured body of material including a precursor to a discrete object 304 and at least a reference feature is illustrated. Method 100 may include manufacturing additively manufactured body of material. For example, at optional step 105, additively manufactured body of material may be additively manufactured. Additive manufacture of additively manufactured body of material may be performed using any additive manufacturing process described above, or using any combination of additive manufacturing processes as described above. At optional step 110, method 100 may include additively manufacturing at least a reference feature on the additively manufactured body of material. At step 115, method 100 includes receiving an additively manufactured body of material including a precursor to a discrete object 304 and at least a reference feature; in some embodiments, this may be accomplished according to optional step 105, optional step 110, or both.

Still referring to FIG. 1, at step 120, the additively manufactured body of material is located within a subtractive manufacturing device using at least a reference feature. At step 125, discrete object is formed from additively manufactured body of material by subtractive manufacturing; subtractive manufacturing may include any process or combination of processes described above for subtractive manufacturing. At optional step 130, at least a reference feature is removed by subtractive manufacturing, which include any process or combination of processes described above for subtractive manufacturing. At step 135, discrete object is removed from subtractive manufacturing device.

Figure 2:
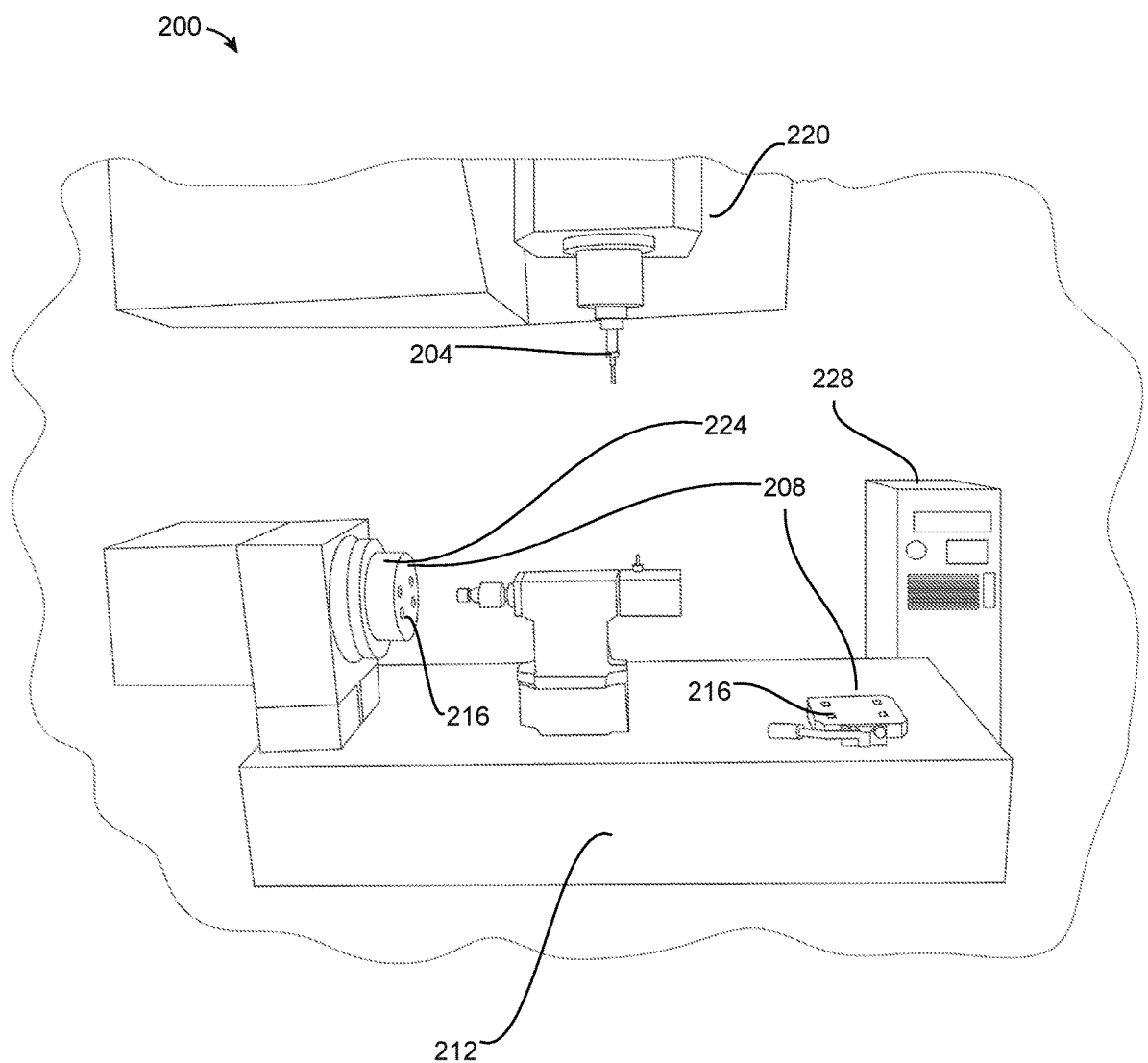
FIG. 2 is a perspective view of an exemplary subtractive manufacturing device in accordance with an embodiment.

Turning now to FIG. 2, an exemplary embodiment of a manufacturing device 200 that may be used in some embodiments to perform one or more manufacturing or computer modeling steps in embodiments of methods is illustrated. Manufacturing device 200 may include at least a manufacturing tool 204; in an embodiment, manufacturing tool 204 may be a component of manufacturing device 200 that performs one or more manufacturing steps as described above. Manufacturing tool 204 may perform one or more subtractive manufacturing steps as described above. Manufacturing tool 204 may include a cutting tool. Cutting tool may be a component that removes material from a workpiece. In some embodiments, cutting tool includes at least an endmill, which may be a component that removes material when rotated against a workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate.

Manufacturing tool 204 may include a tool changer that can switch a plurality of endmills onto and off of manufacturing tool 204; for instance, tool changer may detach an endmill currently attached to a spindle and attach a different endmill to the same spindle, enabling the automated manufacturing device to use more than one endmill in a single automated manufacturing process. Manufacturing tool 204 may include a tool changer that can switch a plurality of endmills onto and off of manufacturing tool 204. Manufacturing tool 204 may include a component used to perform EDM, such as a wire for wire EDM or an electrode. Manufacturing tool 204 may include one or more lasers. Manufacturing tool 204 may include one or more abraders.

Alternatively or additionally, manufacturing tool 204 may include at least an additive manufacturing tool capable of performing one or more additive manufacturing steps as described above. Manufacturing tool 204 may, as a non-limiting example, include one or more additive printer heads such as those used in rapid prototyping and/or "3D printing" processes, or the like. Manufacturing tool 204 may include an extruding device for extruding fluid or paste material, a sprayer or other applicator for bonding material, an applicator for powering, a sintering device such as a laser, or other such material. Furthermore, discrete object may be formed from precursor to a discrete object 304 by additive manufacturing.

Still referring to FIG. 2, manufacturing device 200 may include a support 208. In an embodiment, a support 208 may be a structure that supports a workpiece during the one or more manufacturing steps. Support 208 may include a base table 212. Base table 212 may include a surface to which a workpiece or other components may be secured. Surface may be oriented horizontally, vertically, or in any other orientation. Surface may be substantially planar. Base table 212 may include various mechanisms to attach components or workpieces to base table 212; for instance, base table 212 may include a quick release attachment mechanism that can be used to attach any component having appropriate attachment features such as quick-release studs. Support 208 may include a fixture, which as used herein is a component used in a manufacturing device to secure a workpiece to the manufacturing device during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in manufacturing device 200 by a plurality of fixtures, such as a plurality of bolts. Support 208 may include a vise, clamp, or other component used to locate or immobilize a workpiece within or at manufacturing device 200.

Still referring to FIG. 2, support 208 may include a substrate for deposition of layers in additive processes. Substrate may be constructed of any material suitable for an additive process to be performed on top of substrate. For instance, and without limitation, substrate may include a metal or other heat-resistant base plate supporting additively added layers in metal additive processes such as DMLS or other laser sintering. Substrate may include a tray structure, e.g. for keeping powder layers used in powder fusion processes from blowing away or spilling during deposition.

Substrate may include a fluid bath or other structure for bathing or coating a workpiece with successive layers, as in stereolithography or the like.

With continued reference to FIG. 2, manufacturing device 200 may include at least a locating feature 216. In an embodiment, at least a locating feature 216 may be at least a feature of manufacturing device 200 that enables a workpiece to be located at manufacturing device 200; in some embodiments, the at least a locating feature 216 enables a workpiece to be located precisely with regard to a coordinate system used to direct the one or more steps. At least a locating feature 216 may include, without limitation, one or more vices, clamps, projections, slots, recesses, or walls; for instance, the at least a locating feature 216 may include a surface of a vise jaw that is immobile with respect to another component such as a support 208 or base table 212, enabling precise prediction of surface's location, and thus of a workpiece surface set against it. At least a locating feature 216 may include a locating feature 216 on support 208; for example, the at least a locating feature 216 may include a bolt-hole, stud-hole, groove, or other recess in a base table 212, trunnion table, or fixture. As a non-limiting example, at least a locating feature 216 may include one or more grooves in a vice. At least a locating feature 216 may include a projection on a base table 212, trunnion table, or fixture. At least a locating feature 216 may include a combination of recesses and projections. The at least a locating feature 216 may include a plurality of locating features, or a single locating feature.

Continuing to refer to FIG. 2, in an embodiment, manufacturing device 200 may be a mechanical manufacturing device. In an embodiment, mechanical manufacturing device may be a manufacturing device 200 that deprives the user of some direct control over the toolpath, defined as movements the manufacturing tool 204 and workpiece make relative to one another during the one or more manufacturing steps. For instance, manufacturing tool 204 may be constrained to move vertically, by a linear slide 220 or similar device, so that the only decision the user may make is to raise or lower the manufacturing tool 204; as a non-limiting example, where manufacturing device 200 is a manually operated machine tool, user may only be able to raise and lower a cutting tool, and have no ability to move the cutting tool horizontally. Similarly, where manufacturing tool 204 includes a slide lathe, a blade on the slide lathe may be constrained to follow a particular path. As a further example, base table 212 may be moveable along one or more linear axes; for instance, base table 212 may be constrained to move along a single horizontal axis. In other embodiments, base table 212 is constrained to movement along two horizontal axes that span two dimensions, permitting freedom of movement only in a horizontal plane; for instance, base table 212 may be mounted on two mutually orthogonal linear slides.

With continued reference to FIG. 2, manufacturing device 200 may include a powered manufacturing device. In an embodiment, a powered manufacturing device may be a manufacturing device in which at least one component of the manufacturing device includes at least a component powered by something other than human power. At least a component may be powered by any non-human source, including without limitation electric power generated or stored by any means, heat engines including steam, internal combustion, or diesel engines, wind power, water power, pneumatic power, or hydraulic power. Powered components may include any components of manufacturing device 200. Manufacturing tool 204 may be powered; for instance, manufacturing tool 204 may include an endmill mounted on a spindle rotated by a motor (not shown). Workpiece support 208 may be powered. Where manufacturing device 200 is a mechanical device, motion of components along linear or rotary constraints may be powered; for instance, motion of base table 212 along one or more linear constraints such as linear slides may be driven by a motor or other source of power. Similarly, rotation of a table may be driven by a power source. Tool-changer, where present, may be driven by power. In some embodiments, all or substantially all of the components of manufacturing device 200 are powered by something other than human power; for instance, all components may be powered by electrical power.

Still referring to FIG. 2, manufacturing device 200 may include an automated manufacturing device. In some embodiments, an automated manufacturing system is a manufacturing device including a controller 224 that controls one or more manufacturing steps automatically. Controller 224 may include a sequential control device that produces a sequence of commands without feedback from other components of subtractive manufacturing device. Controller 224 may include a feedback control device that produces commands triggered or modified by feedback from other components. Controller 224 may perform both sequential and feedback control. In some embodiments, controller 224 includes a mechanical device. In other embodiments, controller 224 includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described below in reference to FIG. 14.

Continuing to refer to FIG. 2, controller 224 may include a component embedded in manufacturing device 200; as a non-limiting example, the controller 224 may include a microcontroller, which may be housed in a unit that combines the other components of manufacturing device 200. Further continuing the example, microcontroller 224 may have program memory, which may enable microcontroller 224 to load a program that directs manufacturing device 200 to perform an automated manufacturing process. Similarly, controller 224 may include any other components of a computing device as described below in reference to FIG. 14 in a device housed within manufacturing device 200. In other embodiments, controller 224 includes a computing device that is separate from the rest of the components of manufacturing device 200; for instance, the controller 224 may include a personal computer, laptop, or workstation connected to the remainder of manufacturing device 200 by a wired or wireless data connection. As a non-limiting example, automated manufacturing device may include a controller 224, which may be coupled to other features thereof via network; in an embodiment, controller 224 may not be currently coupled to other materials, such that automated manufacturing device may include only controller. In some embodiments, controller 224 includes both a personal computing device where a user may enter instructions to generate a program for turning workpiece into a finished product, and an embedded device that receives the program from the personal computing device and executes the program. A person of ordinary skill in the art will readily appreciate, after reading the instant application in its entirety, the various ways that a controller 224, which may include one or more computing devices, may be connected to or incorporated in a manufacturing device 200 as described above.

With continued reference to FIG. 2, controller 224 may control components of manufacturing device 200; for instance, controller 224 may control elements including without limitation tool changer to switch endmills, spindle or gear systems operatively coupled to spindle to regulate spindle rotational speed, linear movement of manufacturing tool 204, base table 212, or both. As an example, in embodiments involving subtractive manufacturing, the equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Persons skilled in the art, upon reading the entirety of this disclosure, will be aware of similar automated control systems usable for various forms of additive manufacturing.

Figure 9:
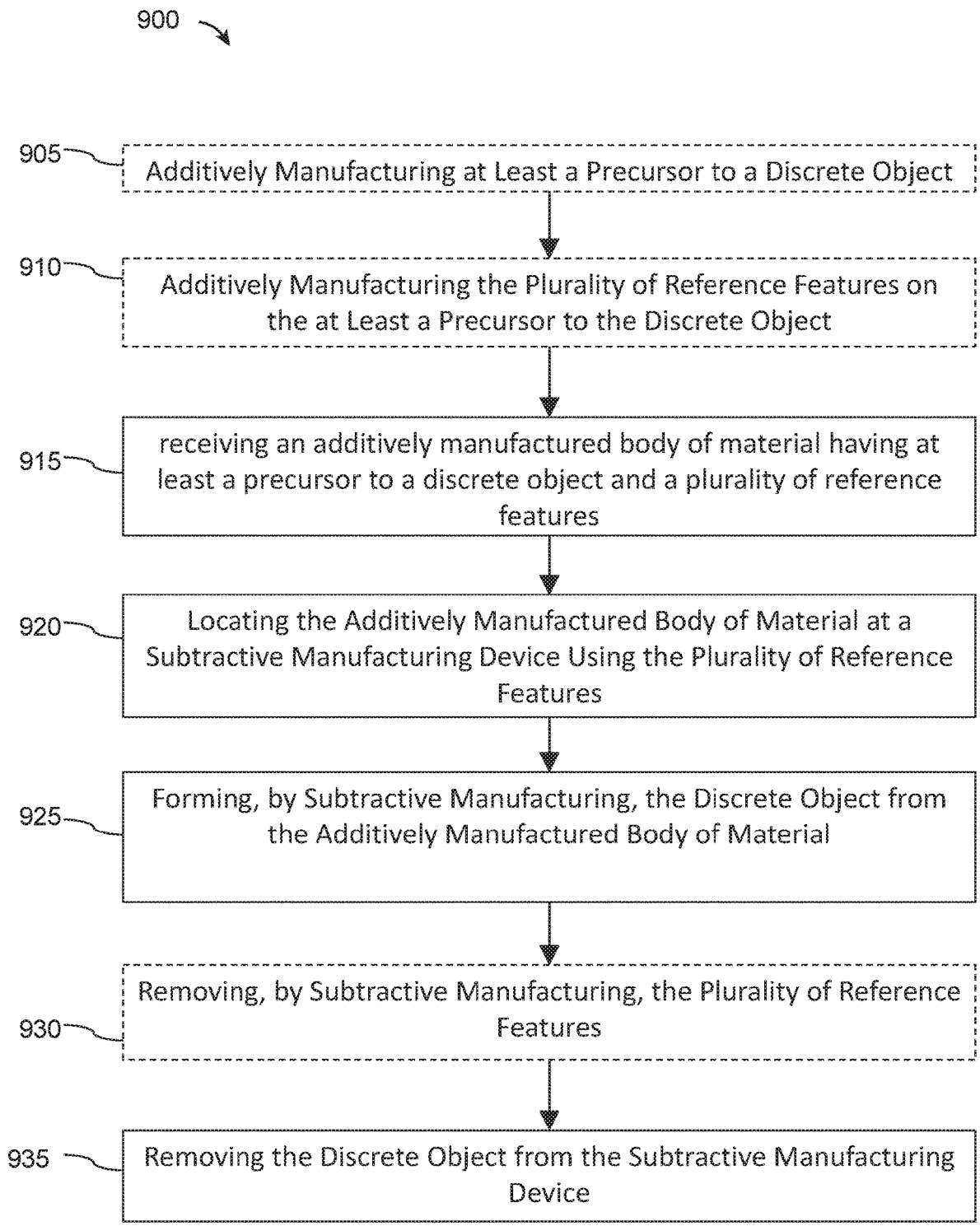
FIG. 9 is a flow diagram illustrating an exemplary method of manufacturing a discrete object from an additively manufactured body of material including a precursor to a discrete object and at least a precursor to at least a reference feature in accordance with an embodiment.

Still referring to FIG. 2, controller may be configured to perform any manufacturing modeling and/or other method step as disclosed herein, including without limitation as described herein in reference to FIGS. 1, 9, and/or 10. In an embodiment, controller 224 is configured to receive a graphical representation of precursor to a discrete object, receive a graphical representation of at least a reference feature on the precursor to the discrete object, and generate a computer model of the body of material, wherein the computer model of the body of material includes the graphical representation of the precursor to the discrete object and the graphical representation of the at least a reference feature.

Figure 3:
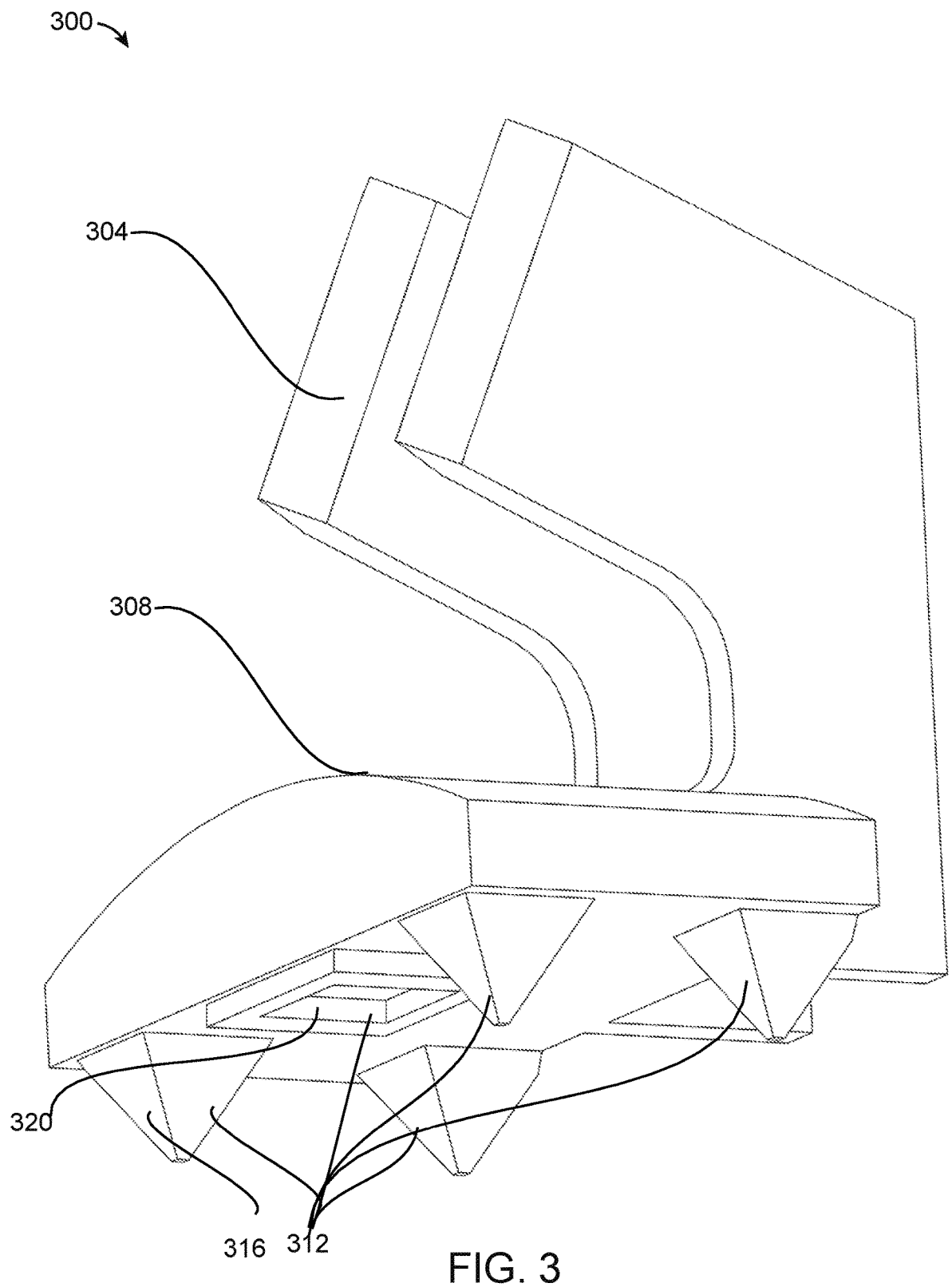
FIG. 3 is a perspective view of an exemplary additively manufactured body of material in accordance with an embodiment.

Turning now to FIG. 3, an additively manufactured body of material 300 is provided. Additively manufactured body of material 300 includes a precursor to a discrete object 304. Precursor to discrete object 304 may be any object that is formed into discrete object by performing method 100. Examples of bodies of material from which the discrete object can be made include, but are not limited to, plates, slabs, blooms, billets, boards, blocks, among many other shapes, including curvilinear and multisided shapes, and any combination thereof, as set forth in further detail below. Precursor to discrete object 304 may include at least a geometric characteristic 308 of discrete object. At least a geometric characteristic 308 of discrete object may be a feature, partial shape, or overall shape recognizable as similar to a feature, partial shape, or overall shape of the discrete object. For instance, where discrete object, when completed, has a substantially disc-shaped form, precursor to a discrete object 304 may have a geometric characteristic 308 of the discrete object where the precursor to a discrete object 304 is substantially disc-shaped; precursor to a discrete object 304 may lack one or more features of discrete object, such as particular dimensions of the substantially disk-shaped form, offset, beveled, flanged or otherwise varied features, surface recesses, grooves, or projections, or the like. Similarly, where discrete object, when completed, includes one or more holes, precursor to a discrete object 304 may possess a geometric characteristic 308 of the discrete object where the precursor to a discrete object 304 is additively manufactured already possessing at least a hole of the one or more holes; at least a hole in precursor to a discrete object 304 may lack one or more features of at least a hole in discrete object, such as threading, a precise shape, dimensions, or broached features, or the like. Precursor to a discrete object 304 may include essentially all features of discrete object, except for a lack of surface, finish, tolerance, or flatness of surfaces. In some embodiments, precursor to a discrete object 304 represents a "near net" discrete object that shares most geometric characteristics with discrete object; for instance, additively manufactured body may visually resemble discrete object but lack threading, forming to a given tolerance, forming to a surface finish, forming to a flatness, or one or more features more readily formed by subtractive manufacturing. In an embodiment, additively manufactured body of material may have some degree of warping; for instance, where additively manufactured body of material was produced by a process such as laser powder-bed fusion or DMLS that involves rapid heating and cooling, warping may occur as a result of the repeated heating and cooling, particularly where a layer with a larger cross-sectional area is constructed on top of a layer with a smaller cross-sectional area. In an embodiment, warping may be predicted by a model for additively manufactured body of material; additively manufactured body of material may be constructed with a greater volume than a discrete object to be produced therefrom, permitting subtractive manufacturing to shape discrete object in a manner correcting warping. Similarly, additive manufacturing may be used to increase an overall volume of part, permitting, for instance, machining to correct for a degree of impreciseness in reference features, overall form, and/or both via the machining process Still referring to FIG. 3, as for the material composing precursor to a discrete object 304, the material may be any suitable material, such as metal (solid, sintered, etc.), polymer (solid, foamed, etc.), wood, composite, and multilayer material, among others. Precursor to a discrete object 304 may be a partially manufactured precursor to a discrete object 304; that is, the precursor to a discrete object 304 may be produced by performing one or more additive manufacturing steps to produce discrete object.

With continued reference to FIG. 3, where additively manufactured body of material has been constructed on, for instance, a base plate, additively manufactured body of material may be removed from base plate by severing one or more connections between additively manufacture body of material and base plate; for instance, additively manufactured body of material may be cut from base plate using wire EDM, a buzz saw, a CNC machine, or other means of cutting or severing material. Additively manufactured body of material may similarly be removed or cut from any other substrate on which additively manufactured body of material was deposited. One or more support features, such as one or more support features constructed to support additively manufactured body of material during additive manufacture, may be removed from additively manufactured body of material by any process described above for removal of material, including without limitation manual or automated processes. In an embodiment, where additive manufacturing has been performed on a base plate, the addition of reference features may make it possible to subtractively manufacture discrete object from multiple directions without having to machine away a base plate; for instance, reference features may be created for two or more machining angles, such that when removed from base plate precursor may be automatically set up at each machining angle using reference features.

In an embodiment, and still referring to FIG. 3, additively manufactured body of material may be manufactured from at least a first manufacturing orientation, and discrete object may be subtractively manufactured out of the additively manufactured body of material from at least a second manufacturing orientation; at least a second manufacturing orientation may be distinct from at least a first manufacturing orientation. To illustrate, at least a first manufacturing orientation may be selected to optimize additive manufacturing by (i) ensuring that portions having small cross-sectional areas are not used to support portions having large cross-sectional areas, (ii) ensuring that overhanging angles or surfaces are deposited at angles minimizing a need for support structures, and/or (iii) minimizing a total number of layers to be deposited to create a model. The first of these may reduce warping in metal additive manufacturing processes. As a non-limiting illustration, a capital letter "H" built from the feet up would be in danger of warping at the transition between the legs and the cross-bar of the "H"; if it is instead built from back to front, the cross-sectional area to be added with each layer remains constant. Further discussion the capital letter "H," building back-to-front would require essentially no support structures, while building from the feet up would require substantial support structures to support the cross-bar. Similarly, building from back to front can be accomplished using fewer layers, reducing the amount of powder that need be deposited; thus, several manufacturing goals in optimizing the manufacture of the capital letter "H" could be met by building from a back-to-front orientation. In more complex three-dimensional forms, there may not be a single orientation that optimizes several goals ideally in this way; persons skilled in the art, upon reviewing the entirety of this disclosure, will be aware of various approaches that may be employed to select an optimal orientation, based on desired attributes or goals of the manufacturing process.

Still viewing FIG. 3, at least a second orientation may be selected to maximize efficiency and/or accuracy of subtractive processes. For instance, at least a second orientation may be selected to minimize a number of set-ups for machining, to ensure that one or more holes may be bored effectively, to maximize the efficiency with which a given volume of material may be removed, or the like. At least a reference feature may thus be chosen to orient additively manufactured body of material, as described in further detail herein, in one or more orientations maximally efficient for subtractive manufacturing. Interrogation may be used to determine such orientations; alternatively or additionally, machine-control instructions may be generated for a plurality of possible orientations, and a set of orientations for manufacturing all features to form from a particular orientation may be selected from the plurality based on machine-control instructions minimizing runtime or otherwise optimizing the subtractive manufacturing process. Persons skilled in the art, upon reviewing the entirety of this disclosure, will be aware of various ways in which subtractive manufacturing orientations may be selected and/or optimized. In an embodiment, a user may specify the subtractive manufacturing orientations, and such orientations may be automatedly used to determine position of at least a reference feature in computer modeling processes as described in further detail below.

Continuing to refer to FIG. 3, method 100 may include manufacturing precursor to a discrete object 304. For example, at optional step 105, precursor to a discrete object 304 may be additively manufactured; precursor to a discrete object 304 may be additively manufactured using any method of additively manufacturing as described above. In some embodiments, additively manufacturing precursor to a discrete object 304 includes creating a computer model of precursor to a discrete object 304, for instance as described in further detail below in reference to FIG. 10. Computer model of precursor to a discrete object 304 may be created by assigning a plurality of computer models of one or more differing structures to locations within a computer model of the precursor to a discrete object 304. This may be performed in any suitable manner, such as using CAD and/or CAM software having a graphical user interface that allows a user to manipulate graphical representations of the objects and/or precursor to a discrete object 304 to effectively place or simulate one or more features of precursor to a discrete object 304 or of discrete object. As part of step 105 or as part of another step in method 100 not specifically enumerated, computer model of precursor to a discrete object 304 may be configured into a three-dimensional model such as a CAM model, STL model, or the like that in later steps of method 100 will be used to guide the operation of one or more additive manufacturing devices to perform the necessary material deposition for forming precursor to a discrete object 304 in the proper number and sequence of steps. In other embodiments, precursor to a discrete object 304 is manufactured using other manufacturing techniques, including without limitation any manufacturing process described above, or any combination of manufacturing processes described above. Additively manufacturing precursor to a discrete object 304 may include additively manufacturing at least a geometric characteristic 308 of discrete object.

At step 120, and still referring to FIG. 3, precursor to a discrete object 304 is received with at least a reference feature 312. At least a reference feature 312 may be a feature designed, configured, and located for precisely locating a precursor to a discrete object 304 relative to subtractive manufacturing device 200. At least a reference feature 312 may locate precursor to a discrete object 304 relative to subtractive manufacturing device 200 by fitting the at least a reference feature 312 to at least a locating feature 216 of the subtractive manufacturing device 200. For instance, at least a reference feature 312 may include one or more projections 316 that fit into one or more recesses in a support 208 at the subtractive manufacturing device 200; as a non-limiting example, where at least a locating feature 216 includes a plurality of holes, such as bolt-holes or stud-holes, the at least a reference feature 312 may include a plurality of projections 316 that fit into the plurality of holes. Where at least a locating feature 216 includes at least a projection, at least a reference feature 312 may include at least a recess 320 into which at least a projection may be housed. In some embodiments, at least a reference feature 312 includes an attachment feature, such as one or more holes to admit bolts or studs, or one or more projections or recesses that fit a locating feature 216 of subtractive manufacturing device 200. At least a reference feature 312 may include one or more recesses, which may fit over one or more projections at subtractive manufacturing device 200.

Figure 4A:
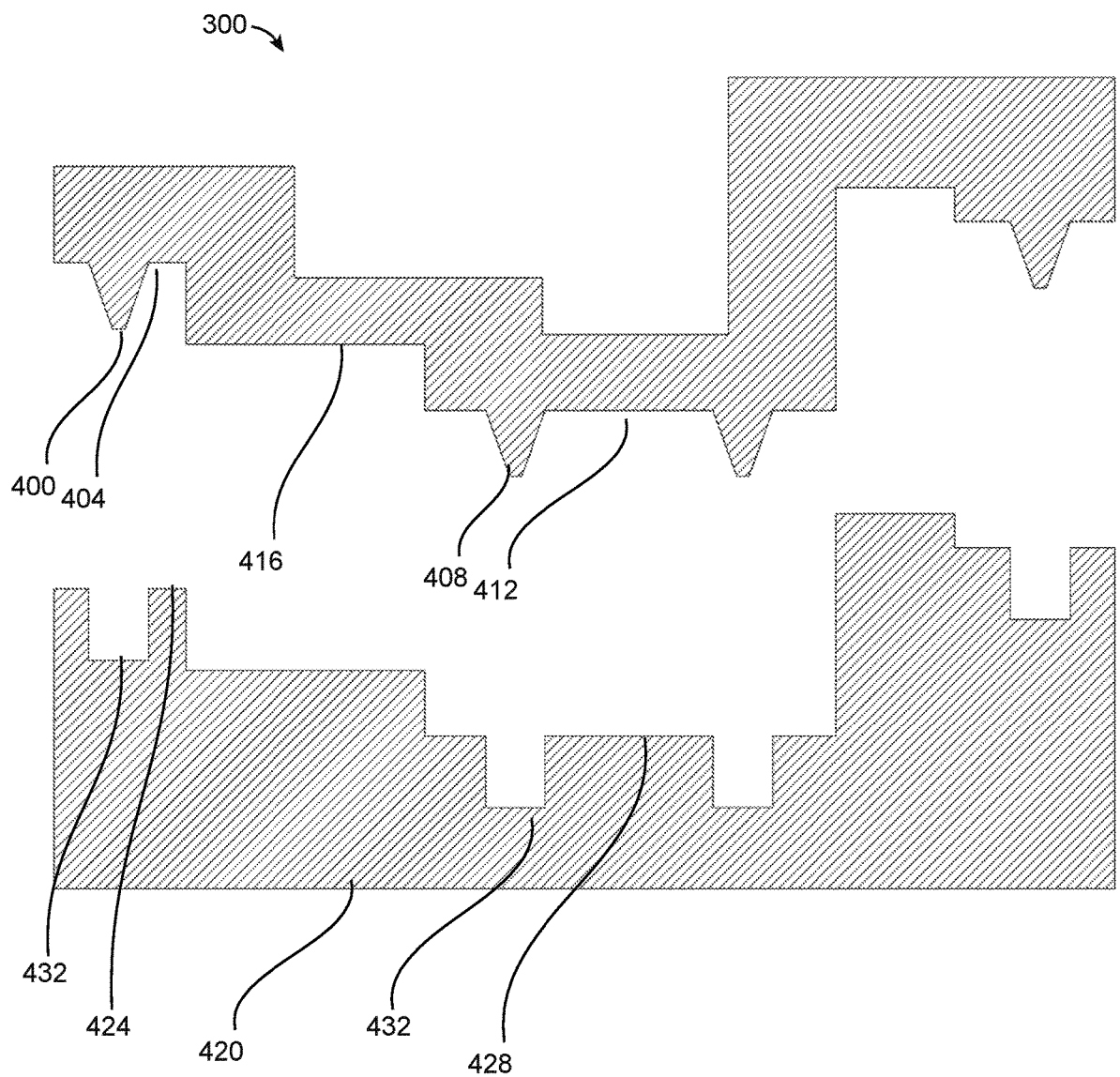
FIG. 4A is a cross-sectional view of an exemplary additively manufactured body of material in accordance with an embodiment.
Figure 4B:
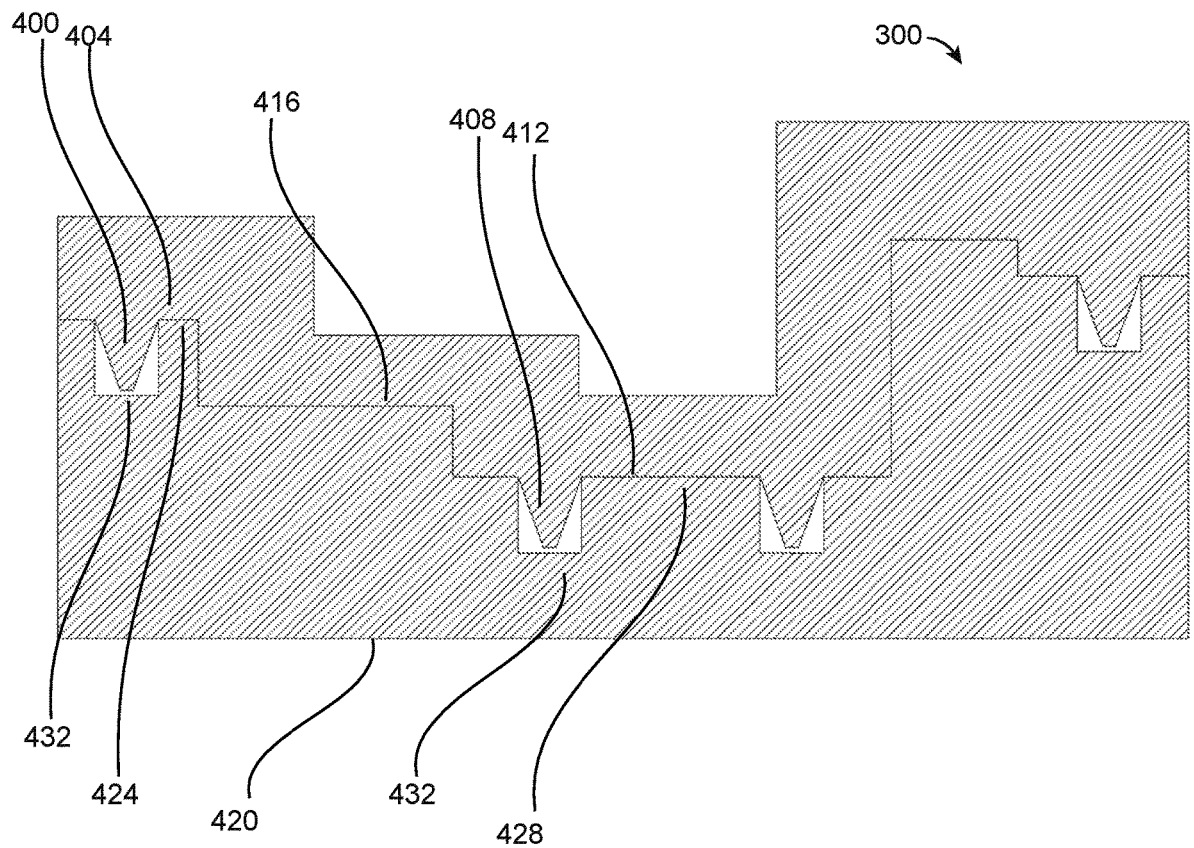
FIG. 4B is a cross-sectional view of an exemplary additively manufactured body of material in accordance with an embodiment.

Referring now to FIGS. 4A-B, at least a reference feature 312 may include a first feature 400 on a first surface 404 of precursor to a discrete object 304 and a second feature 408 on a second surface 412 of precursor to a discrete object 304. This may be used to position additively manufactured body of material 300 in an orientation consistent with manufacturing instructions to be implemented by subtractive manufacturing device 200, such as manufacturing instructions that use a coordinate system to direct the subtractive manufacturing device 200 and assume the precursor to a discrete object 304 is in a particular orientation with respect to that coordinate system. For instance, where precursor to a discrete object 304 is oriented with a bottom side 416 oriented to rest on a support 208 so that an opposite surface may be subjected to subtractive manufacturing, the bottom side 416 may have surfaces at distinct heights with regard to support 208; in other words, first surface 404 may be at a distinct height from second surface 412. In an embodiment, an element 420 of subtractive manufacturing device 200, which may be a support 208, may have corresponding surfaces 424, 428 that support surfaces of bottom. Corresponding surfaces 424, 428 may include locating features 432, which may be any locating features 216 as descried above, to which first feature 400 and second feature 408 may be fitted to locate additively manufactured body of material 300. Surfaces at different heights with respect to support 208 may have reference features of at least a reference feature 312 that orient the surfaces with respect to corresponding surfaces on support 208, for instance using locating features 432. Support 208 may be configured, manufactured, or adjusted to complement a shape of precursor to a discrete object 304.

Figure 5A:
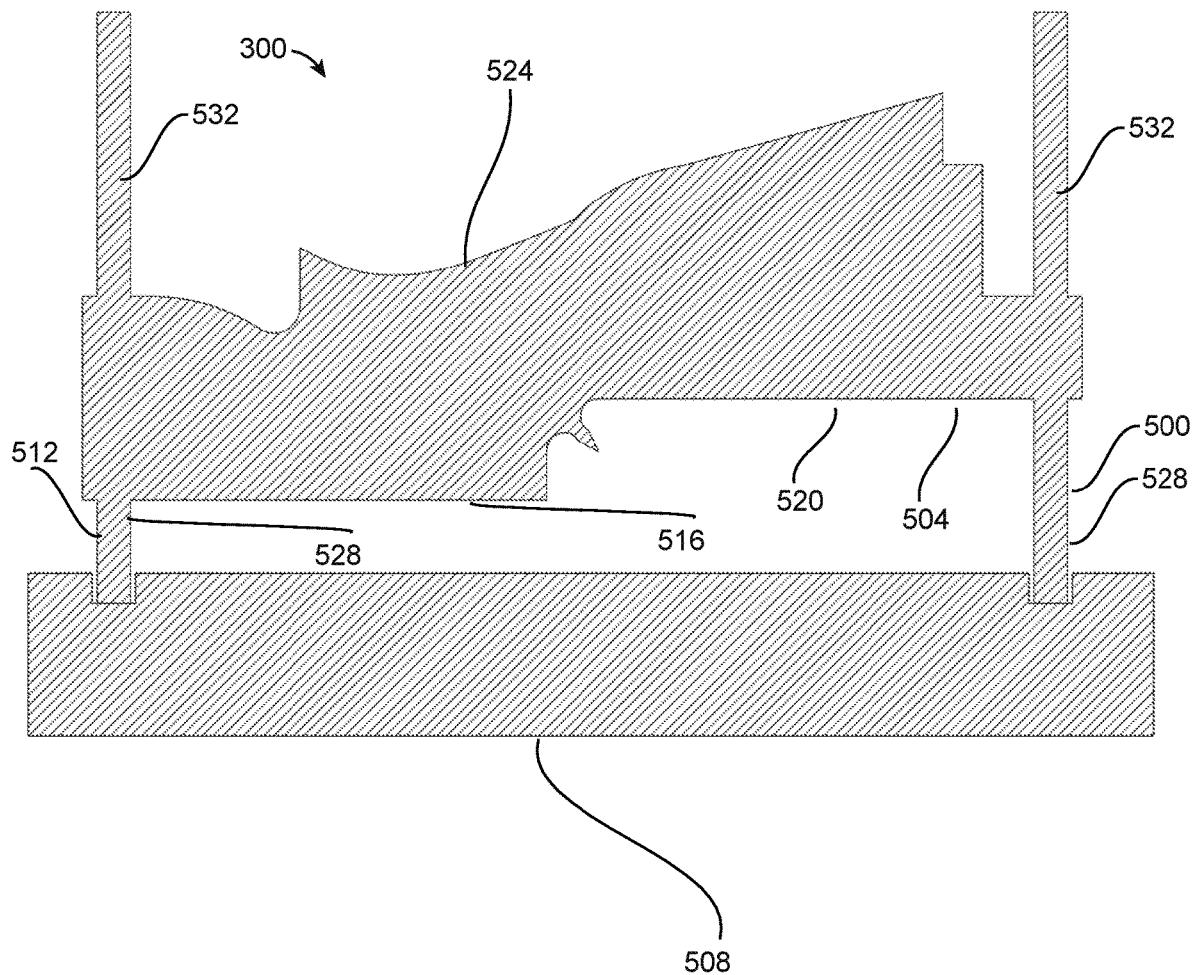
FIG. 5A is a cross-sectional view of an exemplary additively manufactured body of material in accordance with an embodiment.

In an embodiment, as illustrated for example in FIG. 5A, at least a reference feature 312 may include a first reference feature 500 that extends further from a first surface 504 of a bottom of precursor to a discrete object 304 that is further from an element 508 of subtractive manufacturing device 200, which may be a support 208, when precursor to a discrete object 304 is in an orientation used to perform some manufacturing steps of step 125, and a second reference feature 512 that extends less far from a second surface 516 that is closer to the element 508 when the precursor to a discrete object 304 is in the orientation used to perform the manufacturing steps. Thus, for instance, where element 508 of secondary manufacturing device has a shape not formed to complement the shape of precursor to a discrete object 304, at least a reference feature 312 may include first and second reference feature 512s that orient precursor to a discrete object 304 in an expected orientation for one or more manufacturing steps; this may enable the use of a standard-shaped fixture or other support 208 with various differently shaped bodies of material.

Figure 5B:
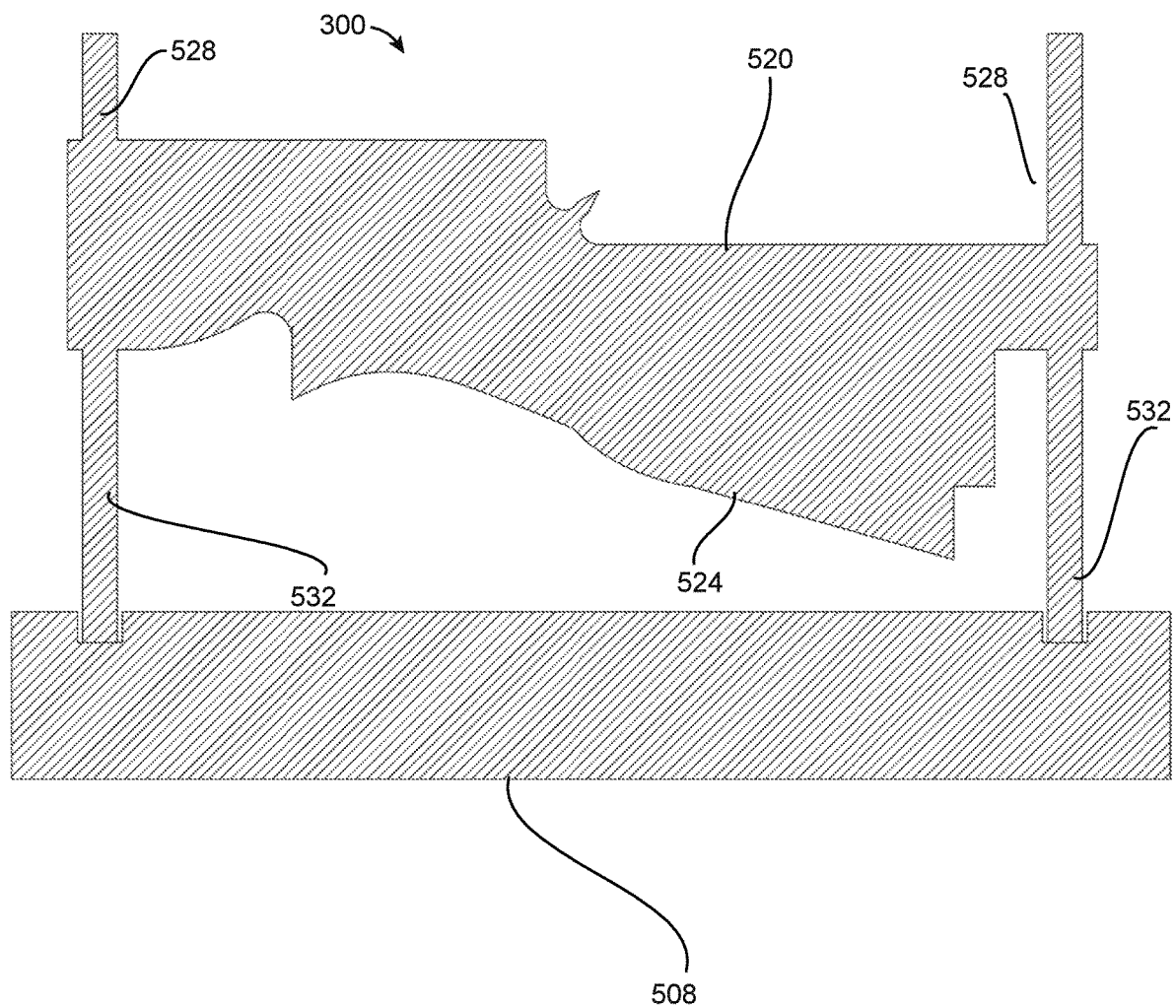
FIG. 5B is a cross-sectional view of an exemplary additively manufactured body of material in accordance with an embodiment.

Still referring to FIG. 5A, additively manufactured body of material 300 may include a first side 520 that faces element 508 when additively manufactured body of material 300 is in a first orientation, and a second side 524 that faces support 208 when precursor to a discrete object 304 is in a second orientation. At least a reference feature 312 may include at least a first-side reference feature 528 on first side 520 and at least a second-side reference feature 532 on second side 524. In an embodiment, and as shown for example in FIG. 5A, at least a first-side reference feature 528 may locate additively manufactured body of material 300 within subtractive manufacturing device 200, for instance by locating the additively manufactured body of material 300 at element 508, when the additively manufactured body of material 300 is in first orientation; as shown in FIG. 5B, at least a second-side reference feature 532 may locate additively manufactured body of material 300 within subtractive manufacturing device 200, for instance by locating the additively manufactured body of material 300 at element 508, when the additively manufactured body of material 300 is in second orientation. In an embodiment, the at least a first-side reference feature 528 and the at least a second-side reference feature 532 enable additively manufactured body of material 300 to be located at the same fixture, support 208, or other element 508 of subtractive manufacturing device 200 in different orientations. Additional sets of reference features on additional sides of additively manufactured body of material 300 may enable location of additively manufactured body of material 300 in additional orientations.

Still referring to FIGS. 5A-B, receiving additively manufactured body of material 300 may include receiving at least a reference feature 312 which has been added to precursor to discrete object. At least a reference feature 312 may have been added to precursor to discrete object through additive manufacturing, for instance as described below for additively manufacturing at least a reference feature 312 on precursor to discrete object. For instance, and without limitation, at least a reference feature 312 may have been added to precursor to discrete object by generating a computer model of the at least a reference feature 312 and additively manufacturing the at least a reference feature 312 as a function of the computer model; this may be implemented for example as described in further detail below.

Figure 6:
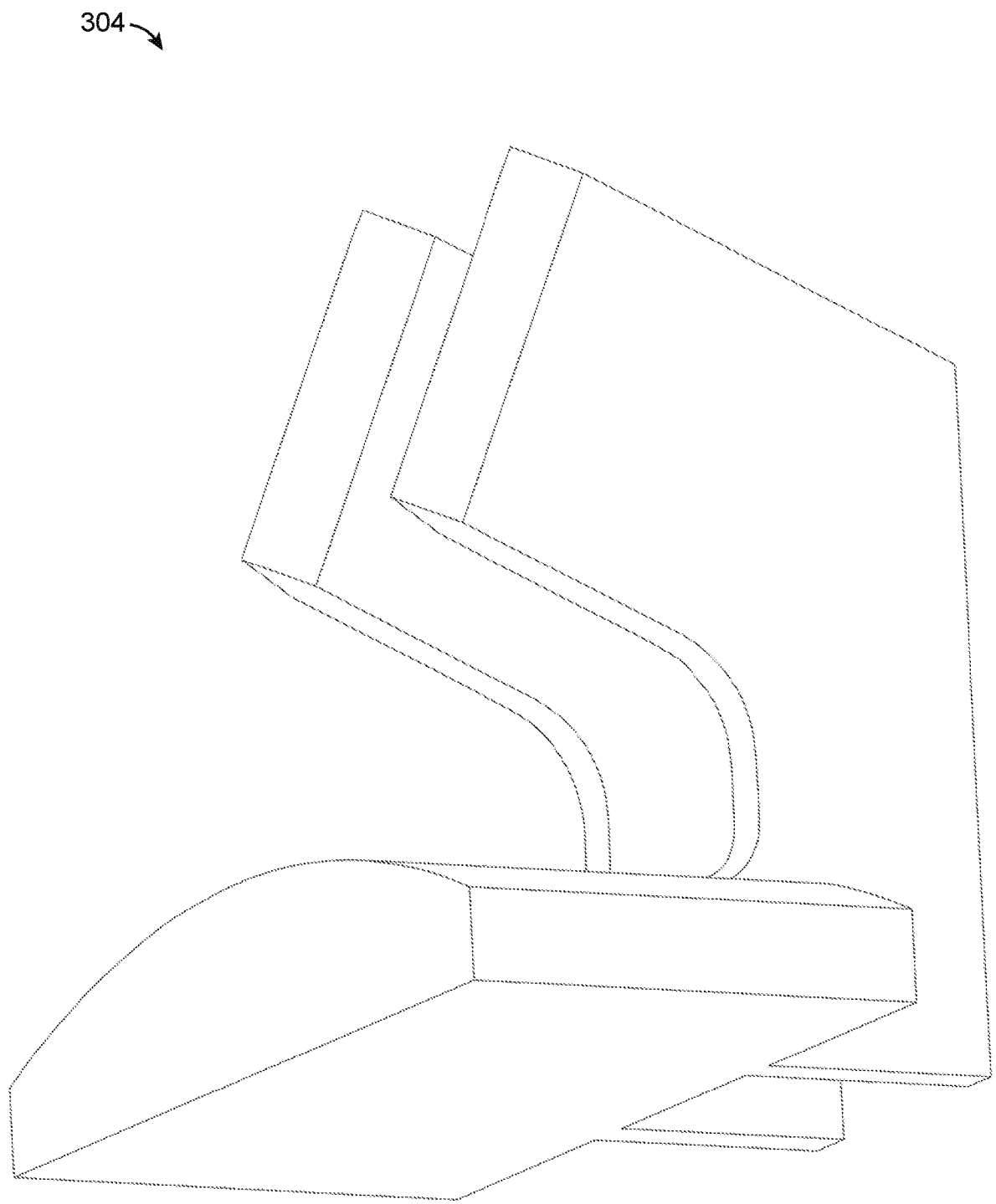
FIG. 6 is a perspective view of a precursor to a discrete object in accordance with an embodiment.

In optional step 110, at least a reference feature 312 may be additively manufactured on precursor to a discrete object 304. As illustrated for exemplary purposes in FIG. 6, precursor to a discrete object 304 may be received without at least one of the at least a reference feature 312; receiving precursor to discrete object may be accomplished by manufacturing the precursor to the discrete object 304 or by manufacturing the precursor to the discrete object 304 as described above. At least a reference feature 312 may be additively manufactured on the precursor to the discrete object. In an embodiment, at least a reference feature 312 may be manufactured as a function of a locating feature 216 at or within subtractive manufacturing device 200; at least a reference feature 312 may be additively manufactured to fit to locating feature 216 by receiving additive manufacturing control commands directing the additive manufacture of the at least a reference feature 312. For instance, where locating feature 216 includes a recess, at least a reference feature 312 may be additively manufactured having at least a projection that fits into the recess. As another example, where locating feature 216 includes a projection, at least a reference feature 312 may be additively manufactured having at least a recess that fits over the projection. Additive manufacturing control commands may be generated using one or more data describing locating feature 216; one or more data may include dimension, size, or shape data concerning locating feature 216. Additive manufacturing control commands may be generated using a computer model or graphical representation of a locating feature 216 at subtractive manufacturing device 200; additive manufacturing may be performed as a function of computer model of the locating feature 216. Additive manufacturing control commands may be generated using a computer model or graphical representation of at least a reference feature 312; additive manufacturing may be performed as a function of computer model of the at least a reference feature 312. Computer model of at least a reference feature 312 may be combined with or created by reference to a computer model of precursor to discrete object, for example as described in further detail below in reference to FIG. 10.

Referring again to FIG. 1, at step 120, additively manufactured body of material 300 is located within a subtractive manufacturing device 200 using the at least a reference feature 312. As used herein, location of additively manufactured body of material 300 "within" subtractive manufacturing device 200 is intended to encompass location of additively manufactured body of material 300 "at," "in," or "on" subtractive manufacturing device 200; for instance, where the subtractive manufacturing device 200 does not have an interior within which additively manufactured body of material 300 may be located, the additively manufactured body of material 300 may be located on or at subtractive manufacturing device 200, for instance by securing the additively manufactured body of material 300 to a support 208 or engaging the additively manufactured body of material 300 to a locating feature 216. Locating may include locating additively manufactured body of material 300 at a support 208. Locating may include locating additively manufactured body of material 300 at a fixture. Support 208 may not be located within subtractive manufacturing device 200 when additively manufactured body of material 300 is mounted to the support 208. In some embodiments, locating includes mounting additively manufactured body of material 300 to support 208 and then locating the support 208 within subtractive manufacturing device 200. As a non-limiting example, where support 208 is a fixtured, additively manufactured body of material 300 may be secured to fixture prior to securing fixture within subtractive manufacturing device 200. Additively manufactured body 300 may be mounted at support 208 using at least a reference feature 312; mounting to support 208 may include locating additively manufactured body of material 300 at support with precision, after which the support 208 may be located within subtractive manufacturing device 200 with precision, so that the additively manufactured body of material 300 is located at the subtractive manufacturing device 200 precisely.

Still referring to FIG. 1, location of additively manufactured body of material 300 within subtractive manufacturing device 200 is accomplished using at least a reference feature 312. At least a reference feature 312 may be fitted to or mated with one or more locating features 216 at subtractive manufacturing device 200. For example, where one or more locating features 216 includes at least a recess and at least a reference feature 312 includes at least a projection, at least a projection may be inserted into at least a recess. As another example, where one or more locating features 216 includes at least a projection and at least a reference feature 312 includes at least a recess, at least a recess may be inserted onto at least a projection. Where at least a reference feature 312 is formed to be located using a fixture, clamp, vise, or other element of subtractive manufacturing device 200, location may involve insertion into or mating with fixture, clamp, vise, or other element of subtractive manufacturing device 200. Location may include location with precision, such as location at precise point and orientation with respect to a coordinate system used by subtractive manufacturing device 200 or machine control instructions directing subtractive manufacturing device 200.

Continuing to refer to FIG. 1, in an embodiment, location is not precise location. Subtractive manufacturing device 200 may be set up to have an origin of a coordinate system at a particular feature of additively manufactured body of material 300; setup may be performed by a user or robot, for instance by advancing a mill of subtractive manufacturing device 200 and moving mill relative to additively manufactured body of material 300 until mill contacts a chosen feature of additively manufactured body of material 300 to establish an origin point. Further measurements or calibration may be used to orient additively manufactured body of material 300 relative to coordinate axes. In addition a 2D or 3D scanner may be used to precisely locate additively manufactured body of material 300 in relation to subtractive manufacturing device 200 As non-limiting example, a scanner may be attached to the subtractive manufacturing device 200 which digitally additively manufactured body of material 300 and uses the resulting point cloud to generate a additively manufactured body of material 300 from which machine instructions may be generated or to which previously generated machine instructions may be mapped. Persons skilled in the art will be aware of many techniques for precisely locating a workpiece within a manufacturing device, for instance to permit the manufacturing device to follow automated toolpaths in performing manufacturing steps on the workpiece.

At step 125, and still referring to FIG. 1, discrete object is formed from additively manufactured body of material 300 by subtractive manufacturing; subtractive manufacturing may include any process or combination of processes described above for subtractive manufacturing. Subtractive manufacturing device 200 may be operated manually or automatically. In some embodiments, subtractive manufacturing device 200 is programmed by one or more machine control instructions; the one or more machine control instructions may be executed using a microcontroller or other computing device imbedded in or attached to subtractive manufacturing device 200. Subtractive manufacturing device 200 may include one or more cutting tools or abrading tools, including but not limited to mills. Forming discrete object may be performed by removing material according to any method described above for subtractive manufacturing. As a non-limiting example, subtractive manufacturing may include milling. Subtractive manufacturing may include the use of EDM, lasers, water jets, and lathes. In some embodiments, where stabilized workpiece is placed on a trunnion table, subtractive manufacturing device 200 may remove material from more than one side of stabilized workpiece. Alternatively, additively manufactured body of material 300 may be machined from one side, reoriented, and machined from another side; this may be accomplished for example as described above in connection with FIGS. 5A-B.

Figure 7:
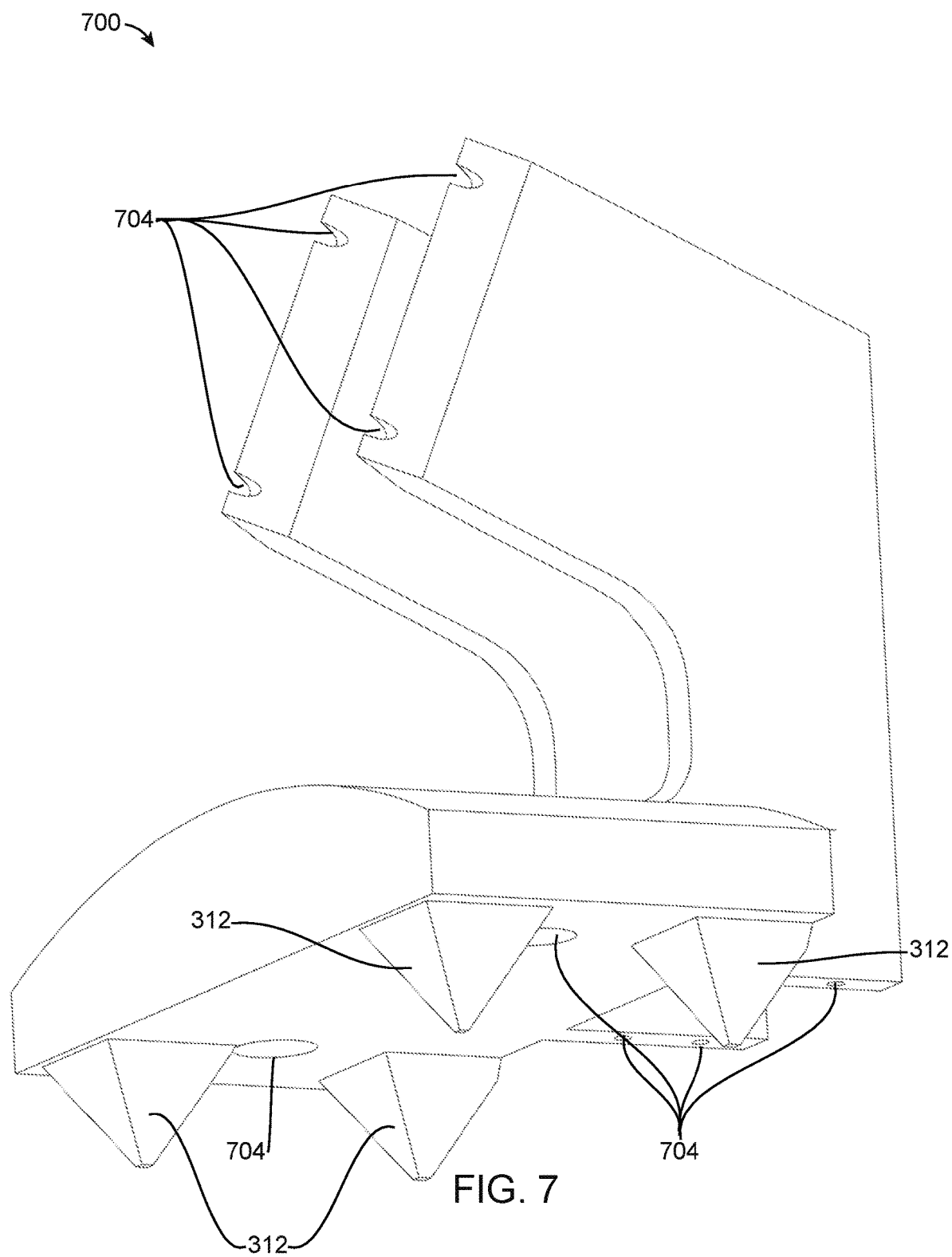
FIG. 7 is a perspective view of a discrete object in accordance with an embodiment.

FIG. 7 illustrates an exemplary embodiment of a discrete object 700 produced during step 125. Discrete object 700 may have one or more features 704 formed on precursor to discrete object 700 by subtractive manufacturing. One or more features 704 may include any feature or features that may be formed on an additively manufactured body of material 300 using subtractive manufacturing, including without limitation through holes, blind holes, threading, grooves, recesses, projections, or cuts to specified tolerances, such as tolerances for press-fits or other tolerance fits.

Figure 8:
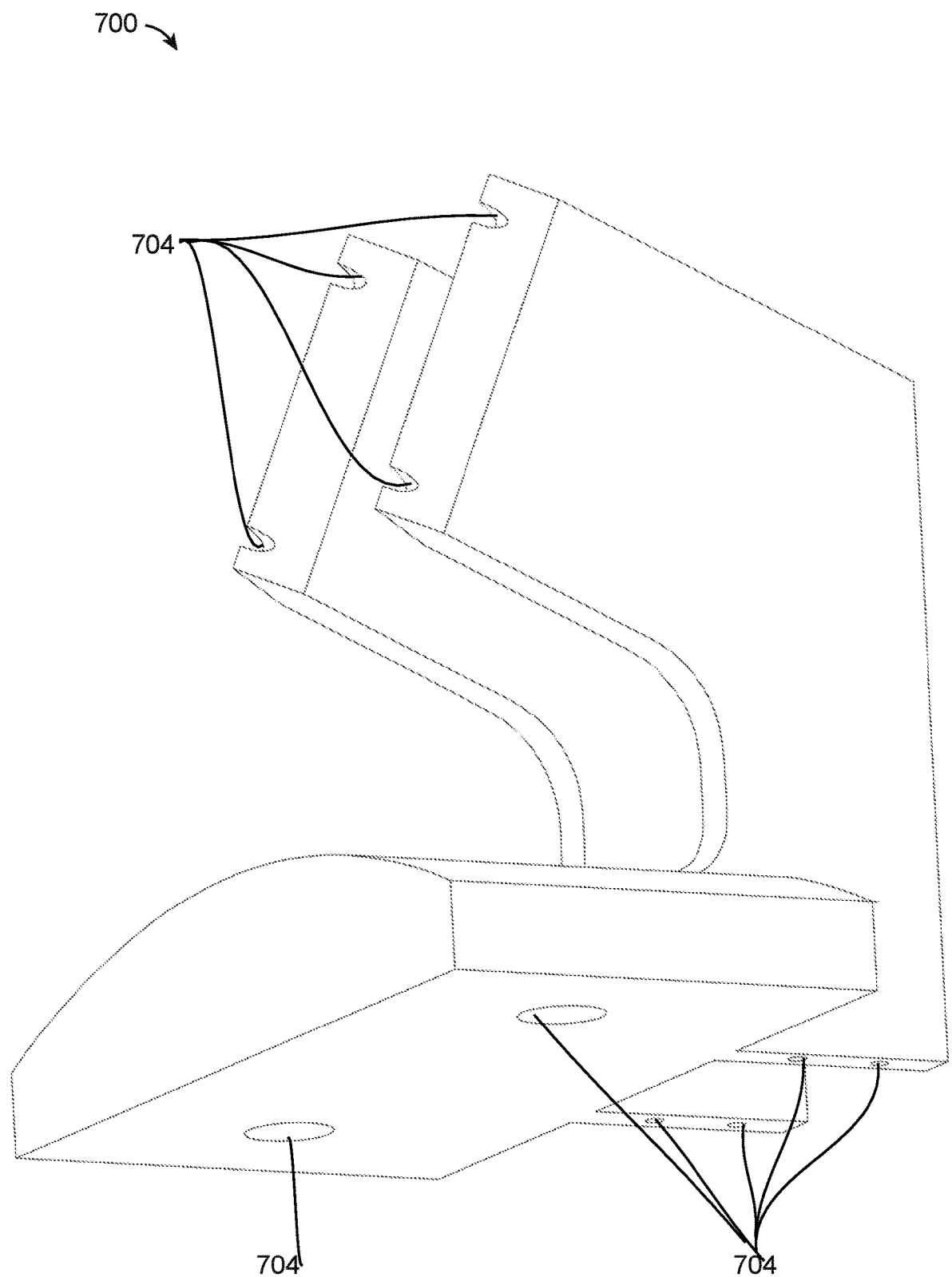
FIG. 8 is a perspective view of a discrete object in accordance with an embodiment.

As illustrated for example in FIG. 8, at least one of at least a reference feature 312 may be removed. For example, at optional step 130, at least a reference feature 312 may be removed by subtractive manufacturing, which include any process or combination of processes described above for subtractive manufacturing. At least a reference feature 312 may be removed by other means, such as sawing, clipping, cutting, or removal by further manufacturing devices.

Referring again to FIG. 1, at step 135, discrete object is removed from subtractive manufacturing device 200. In a further optional step (not shown), the discrete object removed from subtractive manufacturing device 200 at step 135 may be further processed as desired to finish that object. Examples of further process include but are not limited to: secondary machining, polishing, coating, silk-screening, and any combination thereof, among others. Fundamentally, there is no limitation on the finishing steps, if any, that may occur at the optional step.

In the foregoing method, the transitions between steps and/or locations at which the steps are performed may vary from one instantiation to another. For example, in an instantiation in which a milling machine, such as a CNC milling machine having a movable horizontal x-y bed and a rotational milling tool that moved in the z (vertical) direction, once a CAM model of the additively manufactured body of material 300 has been provided to the milling machine and additively manufactured body of material 300 is properly located for machining by the CNC milling machine, the machine may be controlled to perform step 125 of method 100 so as to one or more components or shapes on a first side of the additively manufactured body of material 300 and leave the additively manufactured body of material 300 together. Once the CNC milling machine has completed machining on one side of additively manufactured body of material 300 one or more workers, robot, or other machine may move the partially milled additively manufactured body of material 300 to a different position at the machine, to permit machining of a second side of additively manufactured body of material 300, as further illustrated below.

Some or all of the steps of method 100 and/or intermediate handling steps between the steps of method 100 may be automated to reduce the need for human interaction and contribution and associated costs. Such automation may be implemented using a work cell approach, wherein multiple steps are performed by one or more multitask or a set of single-task work-cell machines and one or more manipulators, as needed, to move a precursor to a discrete object 304 among the work-cell machines. Alternatively, the automation may be implemented using an assembly-line approach, wherein two or more single and/or multitask machines form an assembly line with suitable automated and/or manual conveyance means (e.g., conveyor belts, robots, dollies, push carts, etc.) for moving each precursor to a discrete object 304 from one machine to the next. Additionally, method 100 is exemplary and a person of ordinary skill in the art, after reading this disclosure in its entirety, will readily appreciate that method 100 may occur in a different order than show here.

Referring now to FIG. 9, an exemplary embodiment of a method 900 of manufacturing a discrete object from an additively manufactured body of material including a precursor to a discrete object and at least a precursor to at least a reference feature is illustrated. In step 905, an additively manufactured body of material including a precursor to a discrete object and at least a precursor to at least a reference feature is received. At step 910, at least a reference feature is formed, by subtractive manufacturing, from at least a precursor to at least a reference feature. At step 915, additively manufactured body of material is located within a subtractive manufacturing device using at least a reference feature. At step 920, discrete object is formed, by subtractive manufacturing, from the additively manufactured body of material. At step 925, discrete object is removed from subtractive manufacturing device.

Still referring to FIG. 9, and further referring to FIG. 3, in step 905, an additively manufactured body of material 300 including a precursor to a discrete object 304 and at least a precursor to a at least a reference feature is received. Precursor to discrete object 304 may be any precursor to discrete object 304 as described above in reference to FIGS. 1-8. At least a precursor to at least a reference feature 3 may have any form suitable for a precursor to a discrete object 304 as described above in reference to FIGS. 1-8; at least a precursor to at least a reference feature may include a "near net" version of one or more of at least a reference feature. Alternatively, at least a precursor to at least a reference feature may include a block of material of any suitable shape from which reference features may be manufactured. At least a precursor to at least a reference feature may be composed of any material or combination of materials suitable for the composition of at least a precursor to a discrete object 304. At least a precursor to at least a reference feature may be manufactured according to any manufacturing methods suitable for the manufacture of at least a precursor to a discrete object 304. At least a precursor to at least a reference feature may be manufactured together with at least a precursor to a discrete object 304.

Still referring to FIG. 9, and further referring to FIG. 4, at step 910, at least a reference feature 312 is formed, by subtractive manufacturing, from at least a precursor to at least a reference feature. Forming by subtractive manufacturing may be implemented using any subtractive manufacturing process described above in reference to FIGS. 1-8.

In an embodiment, at least a reference feature 312 may be manufactured as a function of a locating feature 216 at or within subtractive manufacturing device 200; at least a reference feature 312 may be subtractively manufactured to fit to locating feature 216 by receiving subtractive manufacturing control commands directing the subtractive manufacture of the at least a reference feature 312. For instance, where locating feature 216 includes a recess, at least a reference feature 312 may be subtractively manufactured having at least a projection that fits into the recess. As another example, where locating feature 216 includes a projection, at least a reference feature 312 may be subtractively manufactured having at least a recess that fits over the projection. Subtractive manufacturing control commands may be generated using one or more data describing locating feature 216; one or more data may include dimension, size, or shape data concerning locating feature 216. Subtractive manufacturing control commands may be generated using a computer model or graphical representation of a locating feature 216 at subtractive manufacturing device 200; subtractive manufacturing may be performed as a function of computer model of the locating feature 216. Subtractive manufacturing control commands may be generated using a computer model or graphical representation of at least a reference feature 312; subtractive manufacturing may be performed as a function of computer model of the at least a reference feature 312. Computer model of at least a reference feature 312 may be combined with or created by reference to a computer model of precursor to discrete object, for example as described in further detail below in reference to FIG. 10. At least a reference feature 312 may be formed as a function of a computer model of the at least a locating feature 216. At least a reference feature 312 may be formed as a function of a computer model of the at least a reference feature 312. At least a reference feature 312 may have any form suitable for at least a reference feature 312 as described above in reference to FIGS. 1-8.

At step 915, additively manufactured body of material is located within a subtractive manufacturing device using at least a reference feature. This may be implemented as described above for step 120 as described in reference to FIG. 1. At step 920, discrete object is formed, by subtractive manufacturing, from the additively manufactured body of material. This may be implemented as described above for step 125 as described in reference to FIG. 1. At step 925, discrete object is removed from subtractive manufacturing device.

Figure 10:
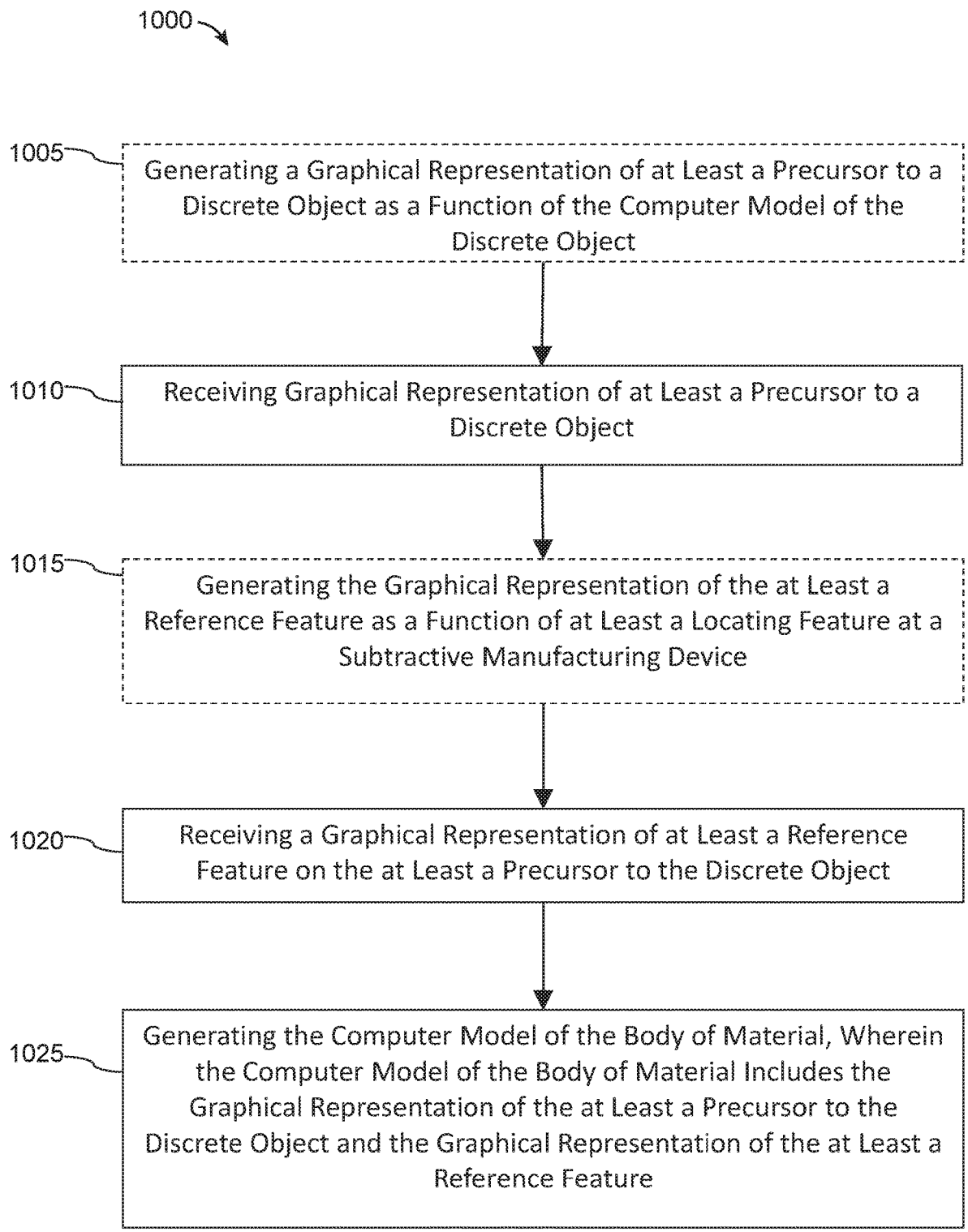
FIG. 10 is a flow diagram illustrating an exemplary method of producing a computer model of an additively manufactured body of material in accordance with an embodiment.

Referring now to FIG. 10, a method 1000 of manufacturing a discrete object from an additively manufactured body of material including a precursor to a discrete object and at least a reference feature. At optional step 1005, a graphical representation of precursor to a discrete object may be generated by an automated manufacturing device 200 and/or controller 224 as a function of a computer model of a discrete object. At step 1010, a graphical representation of precursor to a discrete object is received at automated manufacturing device 200 and/or controller 224. At optional step 1015, a graphical representation of at least a reference feature may be generated as a function of at least a locating feature at a subtractive manufacturing device, by automated manufacturing device 200 and/or controller 224. At step 1020, a graphical representation of at least a reference feature on precursor to the discrete object is received at automated manufacturing device 200 and/or controller 224. At step 1025, a computer model of a body of material is generated at automated manufacturing device 200 and/or controller 224, the computer model of the body of material including graphical representation of precursor to discrete object and graphical representation of at least a reference feature.

In an embodiment, and still viewing FIG. 10, modeling may include detection of one or more geometric features of objects to be formed from body of material or of one or more precursor elements in body of material. Detection of one or more geometric features may include detection one or more features to form from additively manufactured body of material. This may be accomplished, as a non-limiting example, by receiving one or more user instructions indicating one or more features to form. Alternatively or additionally, automated manufacturing device 200 and/or controller 224 may detect at one or more features to form, locations for at least a reference feature geometry of at least a locating feature and/or at least a reference feature, or any other geometric feature to be detected, modified, used, or manufactured according to any means or method herein, by interrogating any or all graphical models and/or computer models as described herein. Interrogation, as used herein, is a process whereby a system incorporating at least a computing device, including without limitation automated manufacturing device 200 and/or controller 224, analyzes a graphical model of a body, discrete object, part, product, workpiece, or the like, and extracts information describing one or more features represented in the graphical model, either as existing features of the body discrete object, part, product, workpiece or the like, or as features to be added to and/or formed thereon. Information extracted during interrogation may include, without limitation, geometrical information, such as lengths, widths, heights, thicknesses, contours, bend radii, opening sizes and locations, volumes, etc.; part clearances; dimensional tolerances; materials; finishes; purchased components, such as mechanical fasteners, hinges, handles, latches, etc.; and certifications. Persons skilled in the art, upon reviewing the entirety of this disclosure, will be aware of various categories of data that may likewise be extracted during interrogation. In some embodiments, model-based pricing information may be considered to be parsed into "raw" variables and "processed" variables. Raw variables are variables that an interrogator can obtain directly from the computer-model data, and processed variables are variables generated by the interrogator from raw variables. Processed variables may be thought of as inputs needed for generating a price but that are not directly available from the computer-model data. In the context of an example for machining fabrication based on a SolidWorks® computer model, raw variables may include face count, surface count, hole count, and counter-bore count, and processed variables may include cutout volume and machining operation setup count.

Interrogation may involve parsing and/or analyzing a graphical model such as a three-dimensional computer model including without limitation a CAD model to identify separate elements thereof by reading specific commands issued by or to a modeling program used to create and/or modify the graphical model. Interrogation may involve parsing and/or analyzing a graphical model to identify specific routines or functions associated with such commands to determine whether they collectively define an individual element or portion (a "shape," "solid body," or "component") of a 3D computer model. Many CAD systems, including, by way of example, SolidWorks® (registered trademark of Dassault Systemes), include an application program interface (API) to enable a user to control the issuance of customized routines or functions associated with such commands. Interrogation may involve reading such commands, routines, and functions to determine whether they define an individual shape, and, if so, may analyze various geometric aspects of the defined shape to determine whether such aspects correspond to one or more manufacturing requirements for a product to be manufactured based on a 3D computer model.

As a non-limiting example of interrogation using or based on the SolidWorks CAD program, interrogation may involve reading the "FeatureManager Design Tree" (an outline representation of individual shapes) to determine the number of solid bodies (or shapes) in the design. Representations of individual shapes may be found in other CAD software files, and other CAD software systems may be used. In SolidWorks, one command usable to analyze the number of solid bodies is:

object[ ] bodies=(object[ ])part.GetBodies2((int)Const.swBodyType_e.swSolidBody, false);

and the output is a list of bodies. The foregoing code statement is listed by way of example only; other code statements or sequences may be used. Interrogation may involve analyzing geometric aspects of such identified shapes and comparing such aspects to corresponding manufacturing requirements. In an embodiment, these manufacturing requirements may include given starting materials. In general, interrogation may be performed using any method, facility, or combination thereof used for identifying features of a graphical model of an object, including without limitation methods or facilities used by CAD or CAM systems, for instance for toolpath generation.

In an embodiment, automated manufacturing device 200 and/or controller 224 may identify at least a feature to be formed by comparing a model of discrete object incorporating such features and/or a model of a part or product to be formed from discrete object to a model of discrete object in which such features are excluded. Interrogation may further provide a modification history one or more computer models indicating one or more features recently added by a user or automated process.

Automated manufacturing device 200 and/or controller 224 may select a first side on which to place at least a reference feature based on detected features; for instance, interrogation may produce data indicating that one or more features to form may be formed by inserting a given side of discrete object in a recess and rotating a resulting unified workpiece to render a location of each feature accessible to a machine tool, for instance on a rotary table or the like; the given side may therefore be selected as first side. This process may be iterative; for instance, automated manufacturing device and/or controller 204 may identify first side, perform the remaining steps of any method disclosed herein for such as modeling and/or manufacture of at least a reference feature on first side, corresponding to the initial first side, then identify a second side and repeat any and all such steps with regard to the second side. First side may alternatively or additionally be specified by user input. Persons skilled in the art, upon review of the entirety of this disclosure, will be aware of various techniques, APIs, facilities, and/or algorithms for automated determination of orientations for manufacture of a given feature on a given discrete object and/or determination of feasibility of formation of a given feature from a given orientation, for instance using toolpath generation programs, machine-control instruction generation programs, "slicers," and the like.

Figure 11:
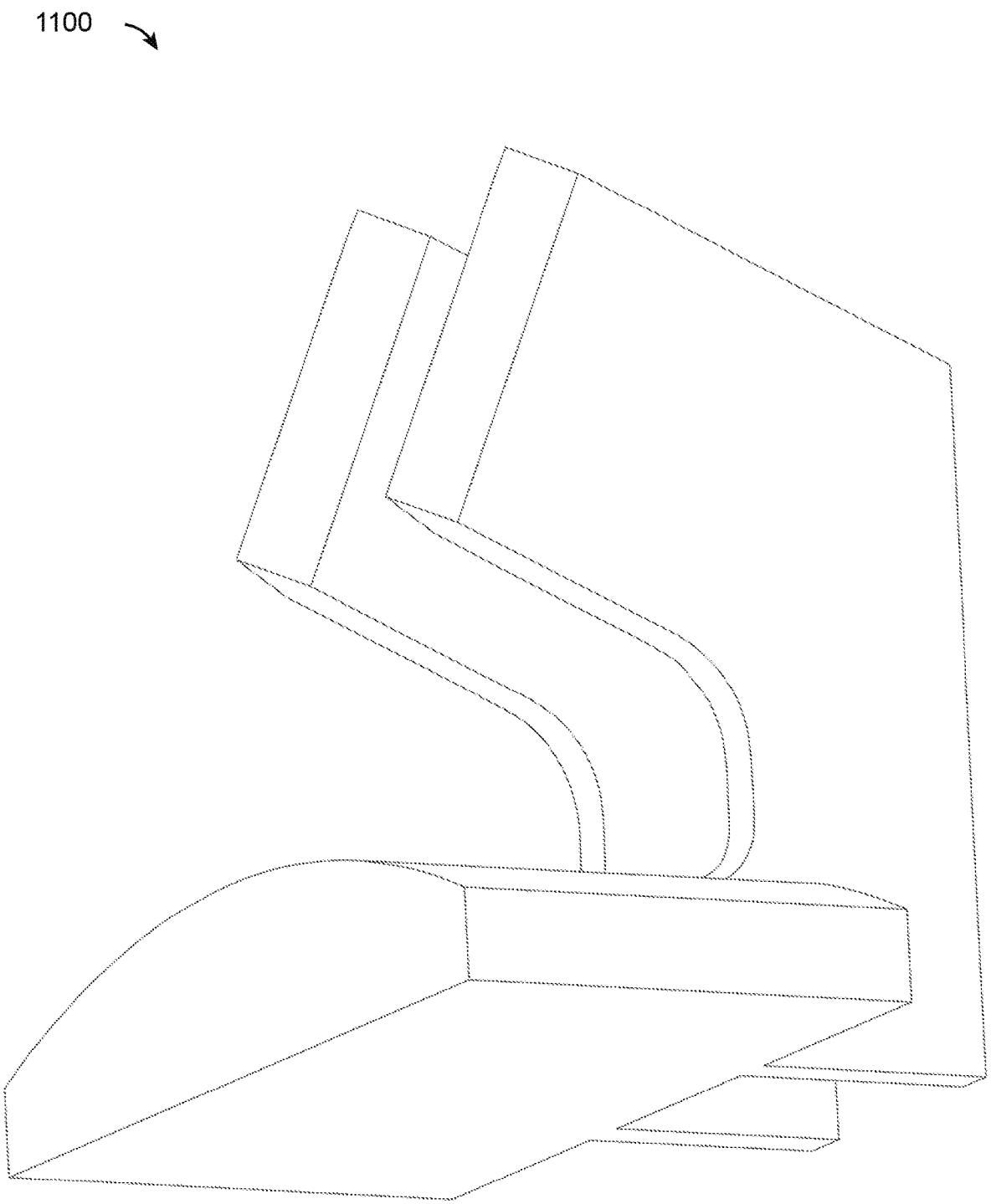
FIG. 11 is a perspective view of a graphical representation of a precursor to a discrete object in accordance with an embodiment.

Still referring to FIG. 10, and also referring to FIG. 11, at step 1010 a graphical representation of precursor to a discrete object 1100 is received. In an embodiment, graphical representation of precursor to discrete object 1100 is received at a computing device, such as any computing device as described below in reference to FIG. 14. Graphical representation of precursor to discrete object 1100 may be received at or opened in a CAD program, CAM program, or other program used for modeling objects for manufacture. Graphical representation of precursor to discrete object 1100 may be received from another computing device via wired or wireless communication, or from a temporary memory storage device.

Still referring to FIGS. 10 and 11, in an embodiment, receiving graphical representation of precursor to discrete object 1100 involves generating the graphical representation of precursor to discrete object 1100. A user may generate graphical representation of precursor to discrete object 1100 in a modeling program such as a CAD program by assembling one or more geometric components of the graphical representation of precursor to discrete object 1100; one or more geometric components may include geometric primitives or more complex models.

Figure 12:
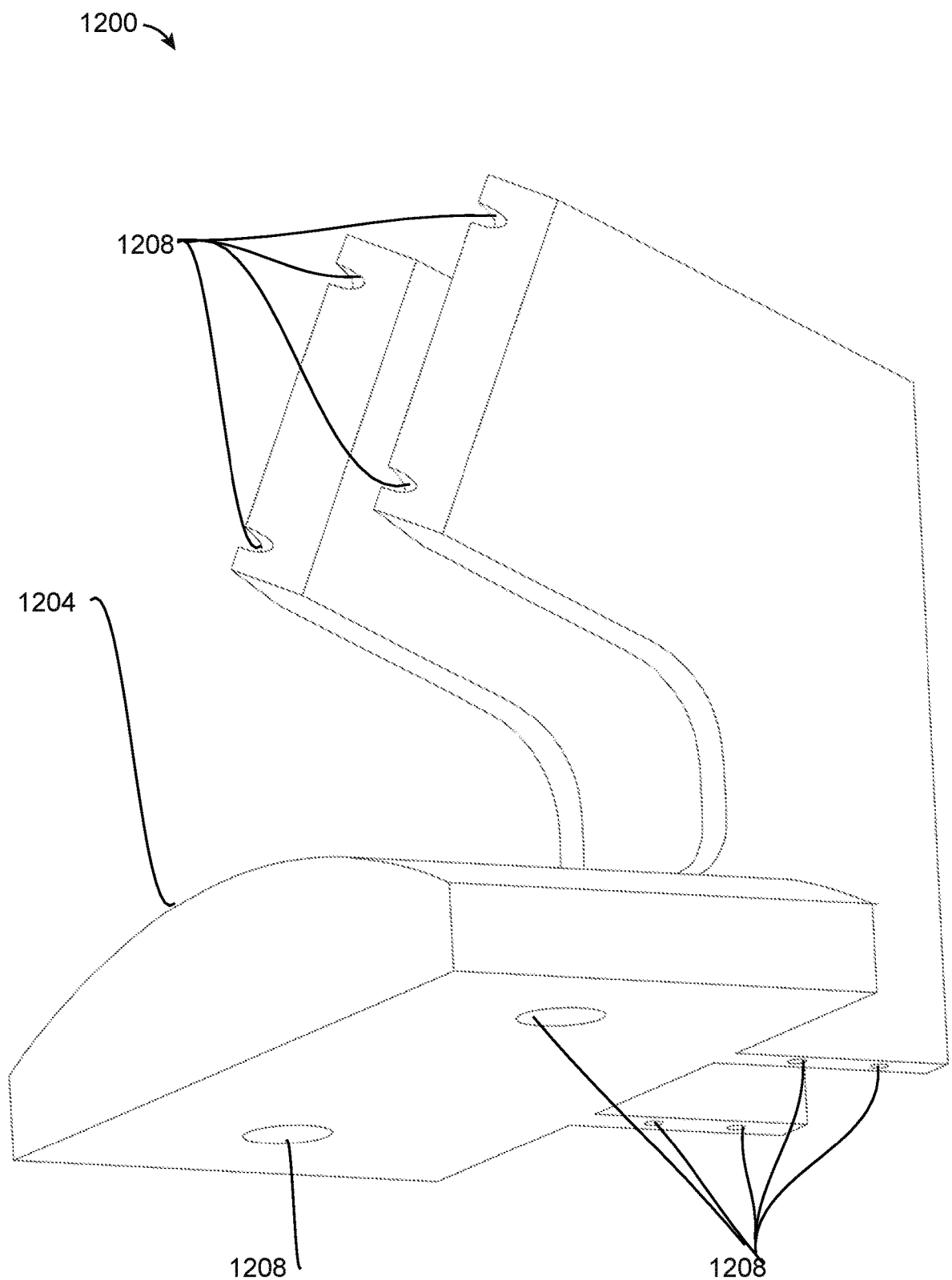
FIG. 12 is a perspective view of a computer model of a discrete object in accordance with an embodiment.

Continuing to refer to FIGS. 10 and 11, graphical representation of precursor to discrete object 1100 may be generated as a function of another model. For example, at optional step 1005, graphical representation of precursor to discrete object 1100 may be generated as a function of a computer model of a discrete object. Referring now to FIG. 12, an exemplary embodiment of a computer model of a discrete object 1200 is illustrated. Computer model of a discrete object 1200 may be received from another machine or generated by a user in a modeling program such as a CAD program; user may generate computer model by assembling geometric components as described above. Graphical representation of precursor to discrete object 1100 may be generated by reproducing one or more geometric features 1204 of computer model of discrete object; one or more geometric features 1204 may be any feature representing at least a geometric characteristic 308 of discrete object as described above in reference to FIGS. 1-8. In an embodiment, graphical representation of precursor to discrete object 1100 is a graphical representation of a "near net" object as described above in reference to FIGS. 1-8; for instance, the geometric representation of precursor to discrete object 1100 may be substantially identical to computer model of at discrete object 1200 except for at least a feature 1208 to be formed, using subtractive manufacturing, from an additively manufactured body of material as modeled in method 1000. At least a feature 1208 may be any feature of discrete object to be formed by subtractive manufacturing as described above in reference to FIGS. 1-8.

Figure 13:
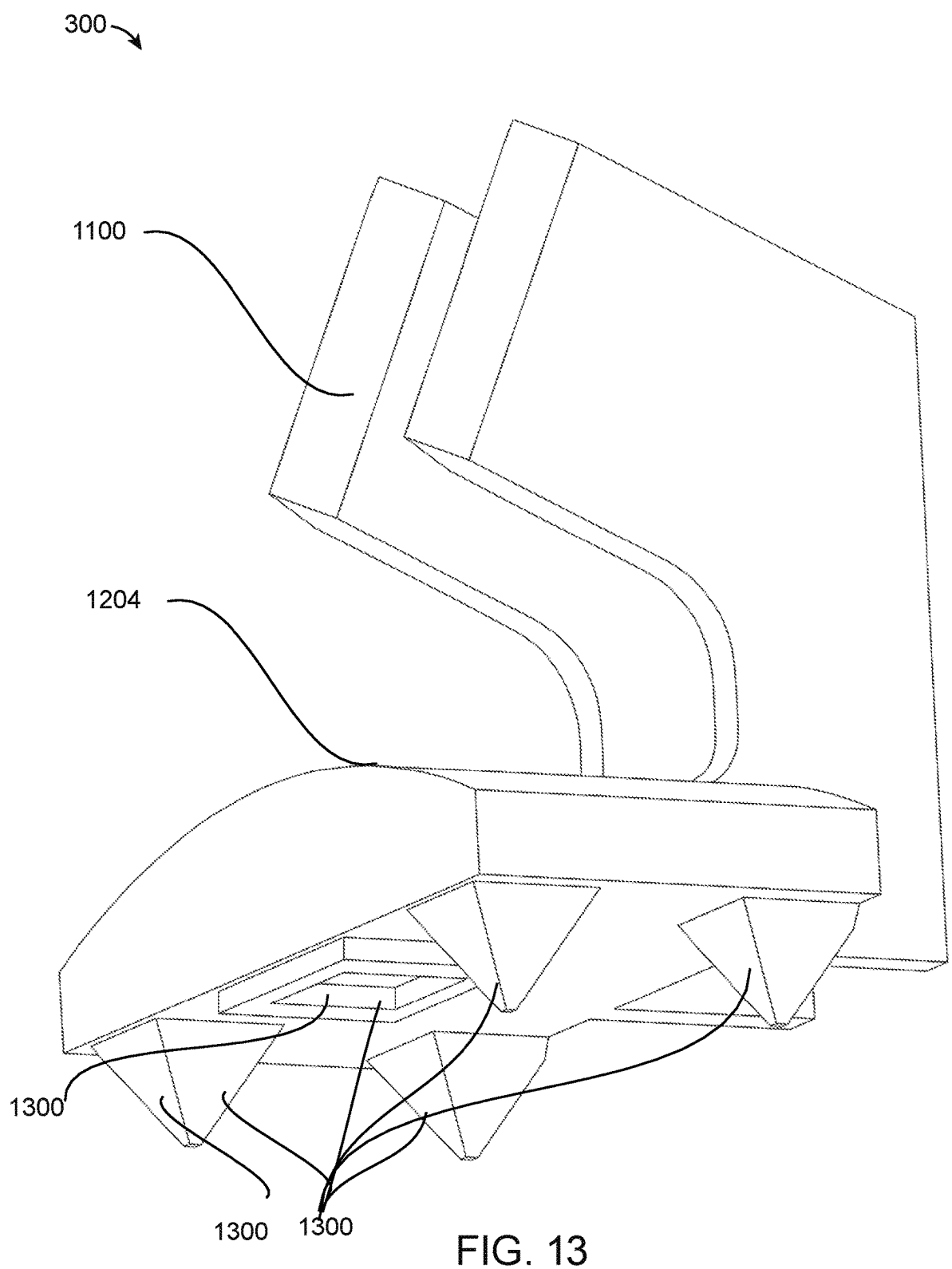
FIG. 13 is a perspective view of a computer model of an additively manufactured body of material in accordance with an embodiment.

Still referring to FIG. 10, and further referring to FIG. 13, at step 1020, a graphical representation of at least a reference feature 1300 on precursor to the discrete object is received. Graphical representation of at least a reference feature graphical representation of at least a reference feature 1300 may be received with graphical representation of precursor to discrete object 1100; for instance, both graphical representation of precursor to discrete object 1100 and graphical representation of at least a reference feature 1300 may be received as part of a single CAD file or file used in another modeling program. Graphical representation of at least a reference feature 1300 may be generated. For instance, at optional step 1015, graphical representation of at least a reference feature 1300 may be generated as a function of at least a locating feature at a subtractive manufacturing device. In an embodiment, data describing at least a locating feature is received; data may include dimension, shape, or size data of at least a locating feature. Data may include a graphical representation of at least a locating feature. Data may be used to generate graphical representation of at least a reference feature 1300; for instance, graphical representation at least a reference feature 1300 may be generated to represent a reference feature that fits within a recess or around a projection. Graphical representation of at least a reference feature 1300 may be generated to represent any at least a reference feature 312 described above in reference to FIGS. 1-8. For instance, graphical representation of at least a reference feature 1300 may include at least a projection. Graphical representation of at least a reference feature 1300 may include at least a recess.

Still referring to FIG. 10 and further referring to FIG. 13, in an embodiment, graphical representation of at least a reference feature may be formed by superimposing a standard feature on the geometry of graphical representation of precursor to discrete object 1100; for instance, a standard shape may be an elongated form that is merged with graphical representation of precursor to discrete object 1100 to project above and below graphical representation of precursor to discrete object 1100, for instance to create representations of first-side reference features 528 and second-side reference features 532 as described above in reference to FIGS. 5A-B. In some embodiments, a plurality of graphical representations of reference features are formed as a function of a plurality of locating features, such as a plurality of bolt or stud holes on a base table, trunnion table, or other table. In an embodiment, generation of graphical representation of at least a reference feature using a graphical representation of at least a locating feature, for instance by superimposing a model of one graphical representation on another and generating a modified model as a result; techniques for performing this process may follow any means or method disclosed in U.S. Non-provisional patent application Ser. No. 15/939,209, filed on Mar. 28, 2018, the entirety of which is incorporated herein by reference.

In an embodiment, and still viewing FIG. 10, graphical representation of at least a reference feature may further include a graphical representation of a first feature on a first surface of precursor to the discrete object and a graphical representation of a second feature on a second surface of precursor to the discrete object; this may be implemented as described above in reference to FIGS. 1-9. As a non-limiting example, interrogation as described above may demonstrate that, in a first orientation selected as described above for subtractive manufacture of discrete object, a first set of reference features may be required to maintain additively manufactured body of material in that first orientation, for instance by joining the first set of reference features to at least a locating feature, while in a second orientation a second set of reference features may be required to maintain additively manufactured body of material in that orientation;

automated manufacturing device 200 and/or controller 224 may generate each of first set of reference features and second set of reference features, for instance, by transforming graphical model of at least a precursor into the first orientation and then second orientation, and performing methods as described further herein for generation of graphical representations of first set of reference features and second set of reference features in each orientation.

With continued reference to FIG. 10, in an embodiment, graphical representation of the at least a reference feature further includes a graphical representation of a first reference feature that extends a first distance from a first surface of the precursor to the discrete object and a graphical representation of a second reference feature that extends a second distance from a second surface of the precursor to the discrete object; as noted above, the first distance may be greater than the second distance. This may be performed, for instance, via interrogation as disclosed above; in a selected orientation, a portion of a surface facing at least a locating feature may be at a greater distance from the at least a locating feature than another portion, as determined by, for instance, geometric analysis of a model combining a model of at least a locating feature with a model of at least a precursor, based upon which first reference feature and second reference feature may be generated with differing lengths to maintain at least a precursor in the selected orientation when at least a reference feature is joined to at least a locating feature.

At step 1025, and continuing to refer to FIG. 10 and FIG. 13, a computer model 1304 of a body of material is generated, the computer model of the body of material including graphical representation of precursor to discrete object and graphical representation of at least a reference feature. In an additional optional step not shown, additive manufacture control instructions may be generated as a function of computer model of body of material. Additive manufacture control instructions may be transmitted to an additive manufacturing device to manufacture precursor to discrete object 304, at least a reference feature 312, or body of material 300, for instance as described above in reference to FIGS. 1-8.

Subtractive machine control instructions may be generated in another optional step not illustrated as a function of computer model of body of material. Subtractive machine control instructions may be transmitted to a subtractive manufacturing device 200, for instance instructing subtractive manufacturing device to manufacture a discrete object 700 as described above in reference to FIGS. 1-8. In an embodiment, generating model of an additively manufactured body of material 300 in accordance with the disclosed method improves the function of computer modeling programs such as CAD programs by enhancing the ability of computer modeling programs to design manufacturing processes; improvements may include the ability to plan manufacturing processes that combine the geometric flexibility of additive manufacturing with the precision and speed of subtractive manufacturing processes. In an embodiment, generating model of an additively manufactured body of material 300 in accordance with the disclosed method improves manufacturing processes and technology by enabling optimal combination of additive and subtractive manufacturing techniques; improvements may include the ability to use manufacturing processes that combine the geometric flexibility of additive manufacturing with the precision and speed of subtractive manufacturing processes.

In an embodiment, and still viewing FIG. 10, automated manufacturing device 200 and/or controller 224 may initiate manufacture of the additively manufactured body of material as a function of the graphical representation of the additively manufactured body of material. This may be performed as described above in reference to FIGS. 1-9, and/or as described in any material incorporated herein by reference. Initiation of manufacture may include performance of a first step in the removal of material from additively manufactured body of material and/or addition of material to additively manufactured body of material as described above; first step may include a particular milling or cutting operation, such as the performance of a registration cut. First step may include location of body of material at an automated manufacturing device; location may include placement in a precise position and/or registration within a coordinate system used by automated manufacturing device to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transmission may involve transmission to a remote device that relays transmission to an automated manufacturing device or computing device coupled thereto, or transmission to an auxiliary computing device or computer memory for transport to the automated manufacturing device and/or computing device coupled thereto. Initiation of manufacture may include initiating additive manufacture of the additively manufactured body of material as a function of the graphical representation of the additively manufactured body of material. Initiating manufacture may include initiating subtractive manufacture of at least a discrete object from the additively manufactured body of material; this may be performed as a function of graphical representation of additively manufacture body of material, a graphical representation of one or more discrete objects, or both.

With continued reference to FIG. 10, automated manufacturing device 200 and/or controller 224 may generate at least a machine-control instruction to subtractively manufacture at least a discrete object from the additively manufactured body of material. This may be performed as described above in reference to FIGS. 1-9, and/or as described in any material incorporated herein by reference. Generating the at least a machine-control instruction may include receiving a graphical representation of the at least a discrete object and generating the at least a machine-control instruction as a function of the graphical representation of the at least a discrete object, for example and without limitation as described above in reference to FIGS. 1-9 and/or in any material incorporated herein by reference. Controller 224 may initiate manufacture of the additive body of material and/or discrete object. This may be performed as described above in reference to FIGS. 1-9, and/or as described in any material incorporated herein by reference. Initiation of manufacture may include performance of a first step in the removal of material from additively manufactured body of material and/or addition of material to additively manufactured body of material as described above; first step may include a particular milling or cutting operation, such as the performance of a registration cut. First step may include location of body of material at an automated manufacturing device; location may include placement in a precise position and/or registration within a coordinate system used by automated manufacturing device to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transmission may involve transmission to a remote device that relays transmission to an automated manufacturing device or computing device coupled thereto, or transmission to an auxiliary computing device or computer memory for transport to the automated manufacturing device and/or computing device coupled thereto. Initiation of manufacture may include initiating additive manufacture of the additively manufactured body of material as a function of the graphical representation of the additively manufactured body of material. Initiating manufacture may include initiating subtractive manufacture of at least a discrete object from the additively manufactured body of material; this may be performed as a function of graphical representation of additively manufacture body of material, a graphical representation of one or more discrete objects, or both.

In an embodiment, methods and systems described above improve the efficiency of manufacturing processes by permitting an additively manufactured body to be set up at a subtractive manufacturing device using features, created during additive manufacturing, that match up to features of the subtractive manufacturing device. As the additive process may be modeled to create such reference features automatically, this may eliminate the need for skilled or time-consuming setup procedures; a person with relatively little training may set up a workpiece so produced by mating an additively created reference feature to a corresponding feature at the subtractive manufacturing device. As a result, one or more setups may be performed rapidly and at little cost. Subtractive manufacturing may be used to remove reference features that are no longer required.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 14:
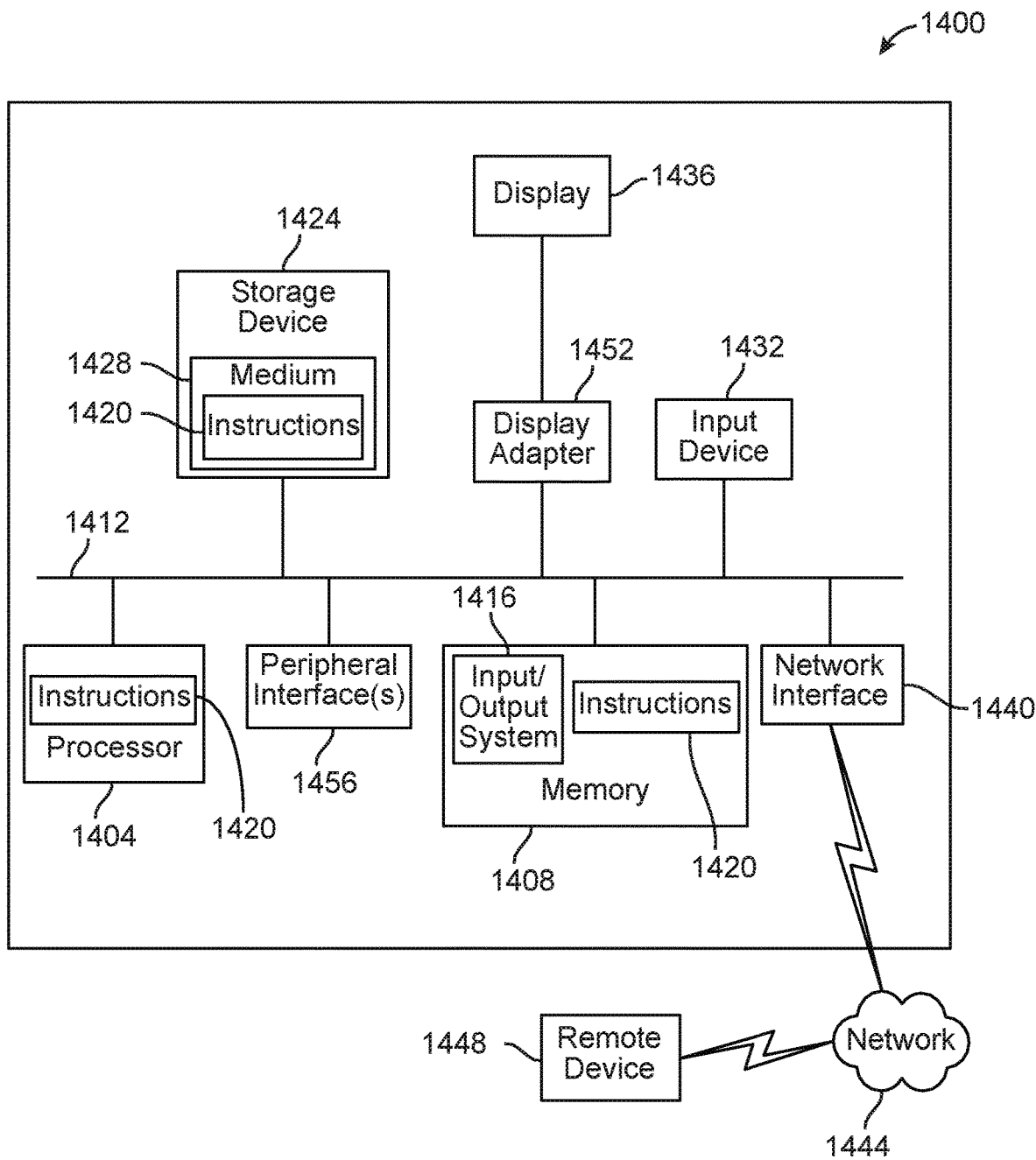
FIG. 14 is a diagrammatic representation of one embodiment of a computing device in the exemplary form.

FIG. 14 shows a diagrammatic representation of one embodiment of a computing device in the exemplary form of a computer system 1400 within which a set of instructions, such as certain steps of FIG. 1, for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Memory 1408 may include various components (e.g., machine-readable media) including, but not limited to, a random access memory component, a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive, a magnetic disk drive, an optical disc drive in combination with an optical medium, a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable medium 1428 may provide nonvolatile and/or volatile storage of machine-readable instructions, data structures, program modules, and/or other data for computer system 1400. In one example, software 1420 may reside, completely or partially, within machine-readable medium 1428. In another example, software 1420 may reside, completely or partially, within processor 1404.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440, may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide graphical representations of aspects of the present disclosure. In addition to a display device, computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for manufacturing a discrete object from an additively manufactured body of material including a precursor to a discrete object and at least a reference feature, the system comprising:
an automated manufacturing device, the automated manufacturing device comprising at least a controller configured to:
receive a graphical representation of precursor to a discrete object;
receive a graphical representation of at least a reference feature to be additively manufactured on the precursor to the discrete object;
generate a computer model of the body of material, wherein the computer model of the body of material includes the graphical representation of the precursor to the discrete object and the graphical representation of the at least a reference feature; and
determine a position of the body of material relative to the automated manufacturing device according to a location of the at least a reference feature on the discrete object.

2. The system of claim 1, wherein the automated manufacturing device further comprises at least a manufacturing tool.

3. The system of claim 2, wherein the at least a manufacturing tool further comprises an additive manufacturing tool.

4. The system of claim 3, wherein the controller is further configured to manufacture the additively manufactured body of material using the additive manufacturing tool.

5. The system of claim 1, wherein the controller is further configured to generate at least an additive manufacturing instruction for manufacturing the additively manufactured body of material, as a function of the graphical representation of the additively manufactured body of material.

6. The system of claim 1, wherein the at least a manufacturing tool further comprises a subtractive manufacturing tool.

7. The system of claim 6, wherein the controller is further configured to subtractively manufacture a plurality of discrete objects from the additively manufacture body of material.

8. The system of claim 6, wherein the controller is further configured to generating at least a machine-control instruction to subtractively manufacture at least a discrete object from the additively manufactured body of material.

9. The system of claim 8, wherein the controller is further configured to receive a graphical representation of the at least a discrete object; and generate the at least a machine-control instruction as a function of the graphical representation of the at least a discrete object.

10. A method of manufacturing a discrete object from an additively manufactured body of material including a precursor to a discrete object and at least a reference feature, the method comprising:
receiving, at an automated manufacturing device, a graphical representation of precursor to a discrete object;
receiving, at the automated manufacturing device, a graphical representation of at least a reference feature to be additively manufactured on the precursor to the discrete object;
generating, at the automated manufacturing device, a computer model of the body of material, wherein the computer model of the body of material includes the graphical representation of the precursor to the discrete object and the graphical representation of the at least a reference feature; and
determining a position of the body of material relative to the automated manufacturing device according to a location of the at least a reference feature on the discrete object.

11. The method of claim 10, wherein receiving the graphical representation of precursor to a discrete object having at least a reference feature further comprises:
receiving a computer model of the discrete object; and
generating the graphical representation of precursor to a discrete object as a function of the computer model of the discrete object.

12. The method of claim 10, wherein receiving the graphical representation of the at least a reference feature further comprises generating the graphical representation of the at least a reference feature as a function of at least a locating feature at a subtractive manufacturing device.

13. The method of claim 10, wherein the graphical representation of the at least a reference feature includes at least a projection.

14. The method of claim 10, wherein the graphical representation of the at least a reference feature includes at least a recess.

15. The method of claim 10, wherein the graphical representation of the at least a reference feature further comprises:
a graphical representation of a first feature on a first surface of the precursor to the discrete object; and
a graphical representation of a second feature on a second surface of the precursor to the discrete object.

16. The method of claim 10, wherein the graphical representation of the at least a reference feature further comprises:
a graphical representation of a first reference feature that extends a first distance from a first surface of the precursor to the discrete object; and
a graphical representation of a second reference feature that extends a second distance from a second surface of the precursor to the discrete object, wherein the first distance is greater than the second distance.

17. The method of claim 10 further comprising initiating manufacture of the additively manufactured body of material as a function of the graphical representation of the additively manufactured body of material.

18. The method of claim 10, further comprising generating at least a machine-control instruction to subtractively manufacture at least a discrete object from the additively manufactured body of material.

19. The method of claim 18, wherein generating the at least a machine-control instruction further comprises:
receiving a graphical representation of the at least a discrete object; and
generating the at least a machine-control instruction as a function of the graphical representation of the at least a discrete object.

20. The method of claim 10, further comprising initiating additive manufacture of at least a discrete object from the additively manufactured body of material.

* * * * *